US011620985B2

(12) United States Patent
Komatsu et al.

(10) Patent No.: US 11,620,985 B2
(45) Date of Patent: Apr. 4, 2023

(54) PATTERN RECOGNITION ROBUST TO INFLUENCE OF A TRANSFER PATH

(71) Applicant: NEC Corporation, Tokyo (JP)

(72) Inventors: Tatsuya Komatsu, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 239 days.

(21) Appl. No.: 17/054,646

(22) PCT Filed: May 15, 2018

(86) PCT No.: PCT/JP2018/018740
§ 371 (c)(1),
(2) Date: Nov. 11, 2020

(87) PCT Pub. No.: WO2019/220532
PCT Pub. Date: Nov. 21, 2019

(65) Prior Publication Data
US 2021/0074268 A1    Mar. 11, 2021

(51) Int. Cl.
*G10L 15/06*      (2013.01)
*G10L 15/02*      (2006.01)

(52) U.S. Cl.
CPC ............ *G10L 15/063* (2013.01); *G10L 15/02* (2013.01); *G10L 2015/0631* (2013.01)

(58) Field of Classification Search
None
See application file for complete search history.

(56) References Cited

U.S. PATENT DOCUMENTS

| 5,970,446 | A | * | 10/1999 | Goldberg | ................ G10L 15/20 704/235 |
| 6,389,393 | B1 | * | 5/2002 | Gong | .................... G10L 15/065 704/E15.009 |
| 9,135,915 | B1 | * | 9/2015 | Johnson | ................... G10L 25/78 |
| 10,854,186 | B1 | * | 12/2020 | Devireddy | ........... G10K 11/178 |
| 2005/0021335 | A1 | * | 1/2005 | Chaudhari | ............ G10L 15/065 704/E15.009 |
| 2008/0260180 | A1 | * | 10/2008 | Goldstein | ............... G10L 15/20 381/110 |

(Continued)

FOREIGN PATENT DOCUMENTS

| JP | 2001-194224 A | 7/2001 |
| JP | 2005-031258 A | 2/2005 |

(Continued)

OTHER PUBLICATIONS

International Search Report for PCT Application No. PCT/JP2018/018740, dated Jul. 17, 2018.

(Continued)

*Primary Examiner* — Douglas Godbold
(74) *Attorney, Agent, or Firm* — Sughrue Mion, PLLC

(57) ABSTRACT

A pattern recognition apparatus includes: a model storage part that stores a model(s) generated by using transfer path information indicating a difference of transfer paths of a signal(s) for training, additional to the signal(s) for training, and a pattern recognition part that inputs an input signal and transfer path information indicating a difference of transfer paths of the input signal, and performs pattern recognition of the input signal by using the model(s).

20 Claims, 19 Drawing Sheets

(56) References Cited

U.S. PATENT DOCUMENTS

| | | |
|---|---|---|
| 2009/0147624 A1 | 6/2009 | Hara et al. |
| 2013/0083929 A1 | 4/2013 | Inoue et al. |
| 2013/0253930 A1* | 9/2013 | Seltzer ................ G10L 15/063 704/E15.001 |
| 2013/0339014 A1* | 12/2013 | Tang ..................... G10L 15/20 704/235 |
| 2015/0179189 A1* | 6/2015 | Dadu ..................... G10L 15/20 704/275 |
| 2015/0206527 A1* | 7/2015 | Connolly ............... G10L 15/24 704/234 |
| 2018/0324518 A1* | 11/2018 | Dusan ................ H04R 1/1091 |
| 2019/0043509 A1* | 2/2019 | Suppappola ........... G06F 3/167 |
| 2020/0074998 A1* | 3/2020 | Sawata .................. G10L 25/78 |
| 2022/0109939 A1* | 4/2022 | Pedersen ............... H04R 25/30 |

FOREIGN PATENT DOCUMENTS

| | | |
|---|---|---|
| JP | 2006-285103 A | 10/2006 |
| JP | 2009-157337 A | 7/2009 |
| JP | 2011-085824 A | 4/2011 |
| JP | 2013-079953 A | 5/2013 |
| JP | 2015-082036 A | 4/2015 |

OTHER PUBLICATIONS

Tatsuya Komatsu, et al. "Acoustic event detection method using semi-supervised non-negative matrix factorization with a mixture of local dictionaries." Proceedings of the Detection and Classification of Acoustic Scenes and Events 2016 Workshop (DCASE2016). 2016. Japan.

Selina Chu, et al., "Environmental Sound Recognition with Time-Frequency Audio Features", IEEE Transactions on Audio, Speech, and Language Processing, Aug. 2009, vol. 17, No. 6, pp. 1142-1158, USA.

Jinyu Li, et al., "An Overview of Noise-Robust Automatic Speech Recognition", IEEE/ACM Transactions on Audio, Speech, and LanguageProcessing, Mar. 2014, vol. 22, No. 4, pp. 745-777, USA.

* cited by examiner

PATTERN RECOGNITION ROBUST TO INFLUENCE OF A TRANSFER PATH

This application is a National Stage Entry of PCT/JP2018/018740 filed on May 15, 2018, the contents of all of which are incorporated herein by reference, in their entirety.

FIELD

The present invention relates to a pattern recognition apparatus, pattern recognition method and pattern recognition program.

BACKGROUND

There is a disclosure about a training scheme of a pattern recognition apparatus and its recognizer for classifying a received acoustic signal into a plurality of predefined acoustic event patterns in Non-Patent Literature 1.

Further, Patent Literature 1 discloses an acoustic identification apparatus capable of identifying a type of an acoustic signal accurately. According to this Patent Literature, an acoustic signal analysis part 200 of this acoustic identification apparatus extracts a feature value based on time characteristic of frequency spectra with a voice component and music component of an acoustic signal from a signal line 101. Further, this acoustic signal analysis part 200 generates the frequency spectra of the acoustic signal in time series, and calculates a differential value per each of frequencies in the frequency spectra generated in its time series. And, the acoustic signal analysis part 200 extracts a variance indicating deviation degree of a frequency distribution based on its calculated deference value, as a feature value of the acoustic signal. And, an acoustic signal identification part 110 identifies whether a type of the acoustic signal is any one of music, superposition of music and voice, and voice, based on the feature value. Finally, this acoustic signal identification part 110 identifies whether or not the type of the acoustic signal is music on the basis of a music threshold value smaller than a feature value corresponding to an acoustic signal superimposed the voice component and music component.

Further, Patent Literature 2 discloses a recognition model training apparatus, capable of training a recognition model having high resistance suitable for using a pattern recognition apparatus performing pattern recognition under an environment including various noises, to improve a pattern recognition rate in the pattern recognition apparatus. Referring to this Patent Literature, a pattern recognition model used for a pattern recognition process in the pattern recognition apparatus is stored in a pattern recognition model storage part 606 of this recognition model training apparatus. And, information for training is input from an information input part 602 and a feature value of information is calculated by an information feature value calculation part 603. Here, a parameter is varied by a parameter variation part 604, and the pattern recognition model is learned by using a feature value which is calculated by the varied parameter in a pattern recognition model training part 605.

Patent Literature 1: Japanese Patent Kokai Publication No. 2011-85824 A
Patent Literature 2: Japanese Patent Kokai Publication No. 2005-31258 A
Non-Patent Literature 1: Komatsu, Tatsuya, et al. "Acoustic event detection method using semi-supervised non-negative matrix factorization with a mixture of local dictionaries." Proceedings of the Detection and Classification of Acoustic Scenes and Events 2016 Workshop (DCASE2016). 2016.

SUMMARY

Following analyses are given by the present invention. There is a problem that pattern recognition performance deteriorates since there is a case where a frequency characteristic of a signal obtained in a reception point is greatly changed in accordance with a transfer path from a sound source to the reception point in the technology described in Non-Patent Literature 1. Regarding to this point, Patent Literatures 1 and 2 are also the same, and it is not considered at all about a point that the frequency characteristic of the signal obtained at the reception point is greatly changed in accordance with the transfer path from the sound source to the reception point.

It is not limited to the acoustic signal that the frequency characteristic of the signal obtained in the reception point is greatly changed in accordance with the transfer path from the sound source to the reception point, but it is common to a signal which is propagated and transmitted in space such as a time series vibration signal or the like obtained from a vibration sensor and whose characteristic is changed by its transfer path.

It is an object of the present invention to provide a pattern recognition apparatus, pattern recognition method and pattern recognition program which can contribute to realization of pattern recognition robust to influence, as above mentioned, of the transfer path of the signal and at a higher accuracy.

According to a first aspect, there is provided a pattern recognition apparatus comprising: a model storage part that stores a model(s) generated by using transfer path information indicating a difference of transfer paths of signals for training, additional to a signal(s) for training, and a pattern recognition part that inputs an input signal and transfer path information indicating a difference of transfer paths of the input signals, and performs pattern recognition of the input signal by using the model(s).

According to a second aspect, there is provided a pattern recognition method in a computer including a model storage part that stores a model(s) generated by using a transfer path information indicating a difference of transfer paths of signals for training, additional to signals for training, the method comprising: inputting an input signal and a transfer path information indicating a difference of transfer paths of the input signals, and a pattern recognition part inputting the input signal and the transfer path information and performing pattern recognition of the input signal by using the model(s). The method is coupled with a specified machine which is a computer performing pattern recognition by using a model(s) generated by using a signal(s) for training.

According to a third aspect, there is provided a program that realizes a function(s) of the above computer. In addition, this program can be recorded in a computer readable (non-transitory) recording medium. Namely, the present invention can also be implemented as a computer program product.

According to the present invention, it is possible to perform pattern recognition robust to the influence of a transfer path of a signal and at a higher accuracy.

PREFERRED MODES

Firstly, an overview of an exemplary embodiment of the present invention will be explained by using figures. In addition, drawing reference signs added to the overview are signs added to each element as an example for convenience to help the understanding, and it is not intended that the present invention is limited to an illustrated exemplary embodiment. Further, a connection path(s) between blocks in figures or the like referring to the following description includes both bidirectional and unidirectional. One-way arrow indicates schematically flow of primary signal (data), and does not exclude bidirectionality. In addition, at a connection point of input and output of each block in figures, a port(s) or interface exist, but explicit description is omitted in figures.

Figure 1:
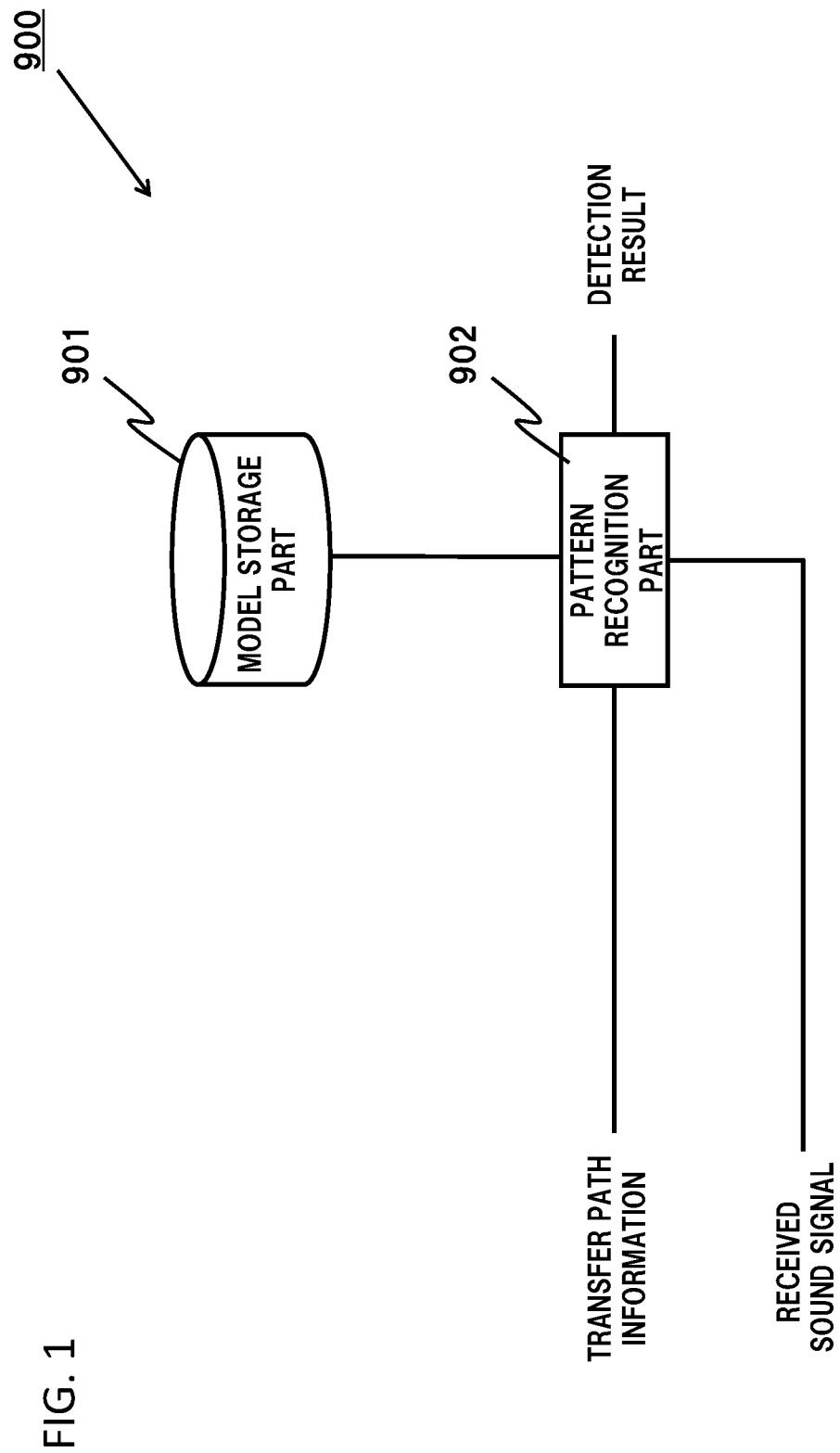
FIG. 1 is a diagram illustrating a configuration of an exemplary embodiment of the present invention.

As illustrating in FIG. 1, the present invention is realized by a pattern recognition apparatus 900 including a model storage part 901, and a pattern recognition part 902 which performs pattern recognition by using this model in one exemplary embodiment.

More concretely, the model storage part 901 stores a model(s) generated by using a transfer path information indicating difference of transfer paths of signals for training, additional to the signal(s) for training.

The pattern recognition part 902 inputs an input signal and a transfer path information indicating difference of transfer paths of the input signals and performs pattern recognition of the input signal by using the model(s).

According to the pattern recognition apparatus 900, pattern recognition is performed in consideration of the transfer path information indicating difference of the transfer paths of the input signals. Thereby, it is possible to perform pattern recognition robust to influence of a transfer path of a signal and at a higher accuracy.

First Exemplary Embodiment

It is explained about an example in which an input signal is an acoustic signal in the following exemplary embodiments. Firstly, it is explained about a relation between a sound source signal and the acoustic signal at a sound receiving point from a point of view of frequency characteristic change of a signal depending on the transfer path.

It will be explained assuming that the sound source signal is described as "s(t)" and the acoustic signal at the sound receiving point is described as "x(t)" in the following. Here, s(t) and x(t) are digital signal sequences obtained by AD conversion (Analog to Digital Conversion) on an analog acoustic signal recorded by an acoustic sensor such as a microphone or the like. The "t" is an index representing a time and a time index of an acoustic signal input sequentially with a predetermined time (for example, time at which an apparatus or sensor is activated) as an original point t=0. Let a sampling frequency be "Fs", then a time difference of the adjacent time indexes "t" and "t+1", that is, time resolution becomes "1/Fs".

The sound source signal s(t) is observed as the acoustic signal x(t) which has propagated and reached a sound receiving point as a sound wave, in the air, in the solid body such as a wall, building, or the like, or in a liquid such as water, oil, or the like. The sound wave propagates in a medium while causing reflection, diffraction, permeation, or the like by influence of a boundary between mediums, height difference of an acoustic impedance level, or the like. A quantified form of a delay caused in s(t) by this propagation or of change of frequency characteristic is called a transfer path (propagation path).

The relation between s(t) and x(t) can be expressed as a following [Expression 1] by using a certain function f(·) with respect to the transfer path.

$$x(t)=f(s(t)) \quad \text{[Expression 1]}$$

In an acoustic digital signal processing field, the function f(·) is generally approximated by a time-invariant FIR filter, namely, the right side of [Expression 1] can be expressed as a convolution of h(t) and s(t) as [Expression 2] by using the FIR filter h(t) whose filter length is "T".

$$x(t) = \sum_{\tau=0}^{T} h(\tau) s(t-\tau)$$ [Expression 2]

Further, change of frequency characteristic of the sound source signal through the transfer path can be expressed as a frequency response of the h(t). In the present invention, the filter h(t) is regarded as a vector which characterizes the transfer path, and the filter h(t) is used as a transfer path feature vector "h".

In estimation of "h", the sound source signal s(t) is generally unknown, and there are many cases where only an observation signal x(t) at a receiving sound point can be obtained. In this case, a scheme or the like performing linear prediction analysis to the x(t) is used. In the present invention, an estimation scheme of the "h" is not limited and an arbitrary estimation scheme may be used.

Figure 2:
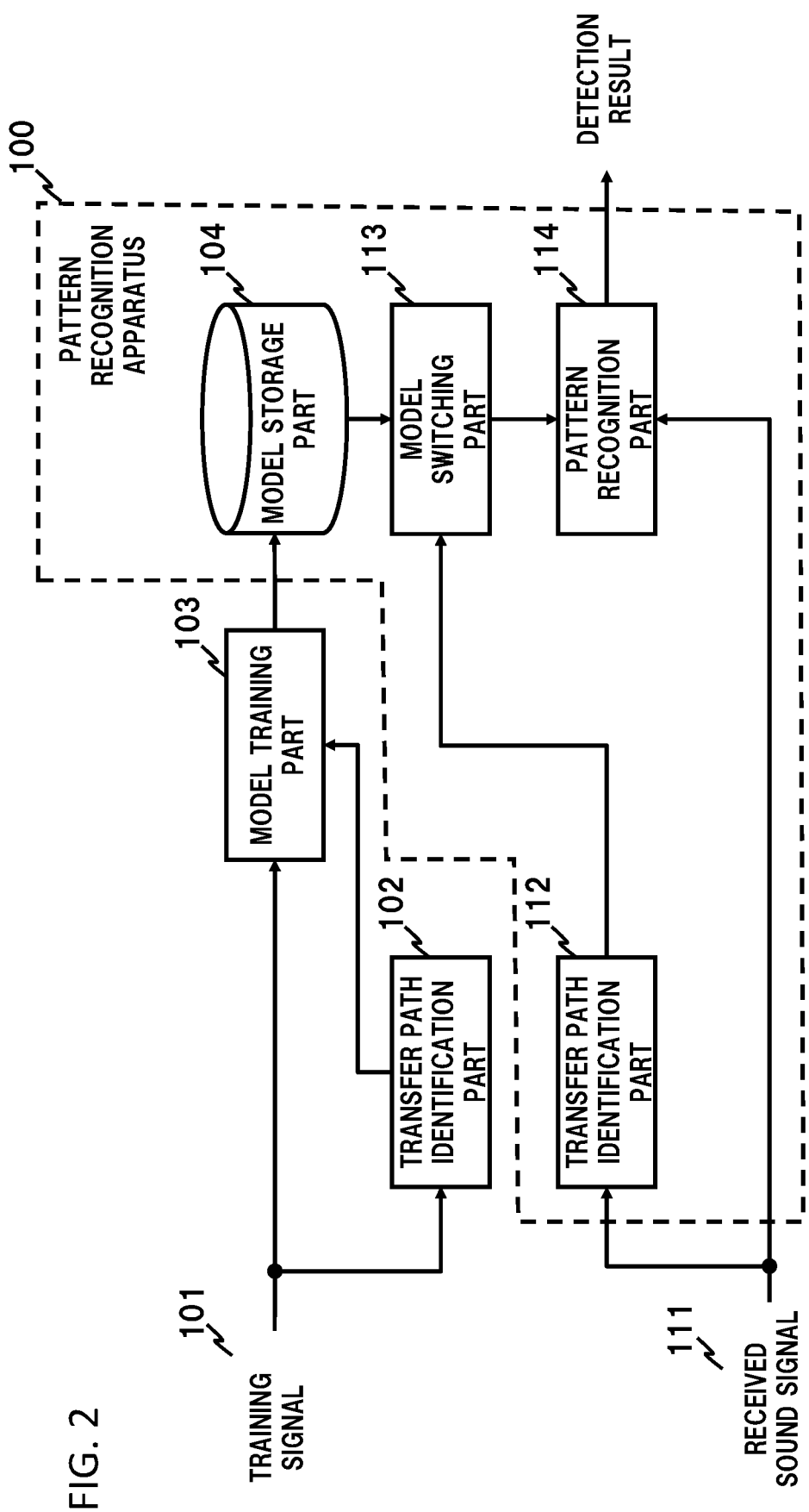
FIG. 2 is a diagram illustrating a configuration of a pattern recognition apparatus in a first exemplary embodiment of the present invention.

Continually, it will be explained about a pattern recognition apparatus 100 in a first exemplary embodiment of the present invention by using FIG. 2. Referring to FIG. 2, a configuration including a configuration which includes a transfer path identification part 102, model training part 103, and model storage part 104 and generates a model(s) for pattern recognition from a training signal, and the pattern recognition apparatus 100 (refer to within a broken line) which performs pattern recognition by using this model(s) is illustrated. Hereinafter, the configuration which includes the transfer path identification part 102, model training part 103, and model storage part 104 and generates the model(s) for the pattern recognition from the training signal is also referred to as a "training part".

The pattern recognition apparatus 100 is configured by including a transfer path identification part 112, model switching part 113, pattern recognition part 114, and the model storage part 104.

A training signal 101 is an acoustic signal for generating a model(s) for pattern recognition in a later stage. The training signal 101 can be represented as a "x_train (t, n)". Here, the "t" is an index representing time and the "n" is a label that x_train (t, n) represents a type of the acoustic signal. For example, when it is considered about a pattern recognition apparatus which discriminates an input acoustic signal into "voice" and "music", it becomes "n={voice, music}". Further, hereinafter, a subscript "x" in a mathematical expression is described as "_x".

The transfer path identification part 102 identifies a transfer path of the training signal x_train (t, n) and outputs a transfer path label "c" of the training signal x_train (t, n). For example, when the transfer path identified by the transfer path identification part 102 is "air" or "wood", the transfer path identification part 102 identifies the transfer path of the training signal x_train (t, n) and outputs "c=air" or "c=wood". Further, an identification scheme of the transfer path in the transfer path identification part 102 will be explained in detail later on.

The model training part 103 generates a model "P" for pattern recognition by using the transfer path label "c", additional to the training signal x_train (t, n). Here, the model "P" is generated such as to output a type of the training signal x_train (t, n), that is, a model identifying "voice" or "music" according to the type of the training signal x_train(t, n) is generated in the aforementioned example. A supervised training signal using an acoustic signal of any one of "voice" and "music" may be used in order to generate this model. Here, another model is generated according to the transfer path label c of the training signal x_train (t, n) in the present exemplary embodiment. That is, when the transfer path label c is two types of {air, wood}, two types of models of P={P_air, P_wood} are generated according to the input c.

The model storage part 104 stores the model P generated by the model training part 103. The above provides a configuration of the training part for generating the model(s) of FIG. 2.

To continue, it will be explained about operation of each part of the pattern recognition apparatus performing the pattern recognition by using the above model(s). A received sound signal 111 is input to the transfer path identification part 112 and pattern recognition part 114. Hereinafter, this received sound signal 111 is described to as a "x(t)".

The transfer path identification part 112 calculates a transfer path label d of the received sound signal x(t) and outputs it to the model switching part 113. Further, the transfer path identification part 112 becomes a configuration equivalent to the above transfer path identification part 102.

The model switching part 113 switches a model used by the post-stage pattern recognition part 114 according to the transfer path label d, and outputs only a model P_d corresponding to the transfer path label d. For example, when d=wood, the model switching part 113 outputs only P_wood among a model P={P_air, P_wood} stored in the model storage part 104.

The pattern recognition part 114 performs pattern recognition regarding the received sound signal x(t) by using the model P_d output from the model switching part 113 and outputs a result. In the present exemplary embodiment, since the pattern recognition which identifies (discriminates) an input acoustic signal as "voice" and "music" is performed, the pattern recognition part 114 performs output of "voice", "music", or unidentifiable.

Figure 3:
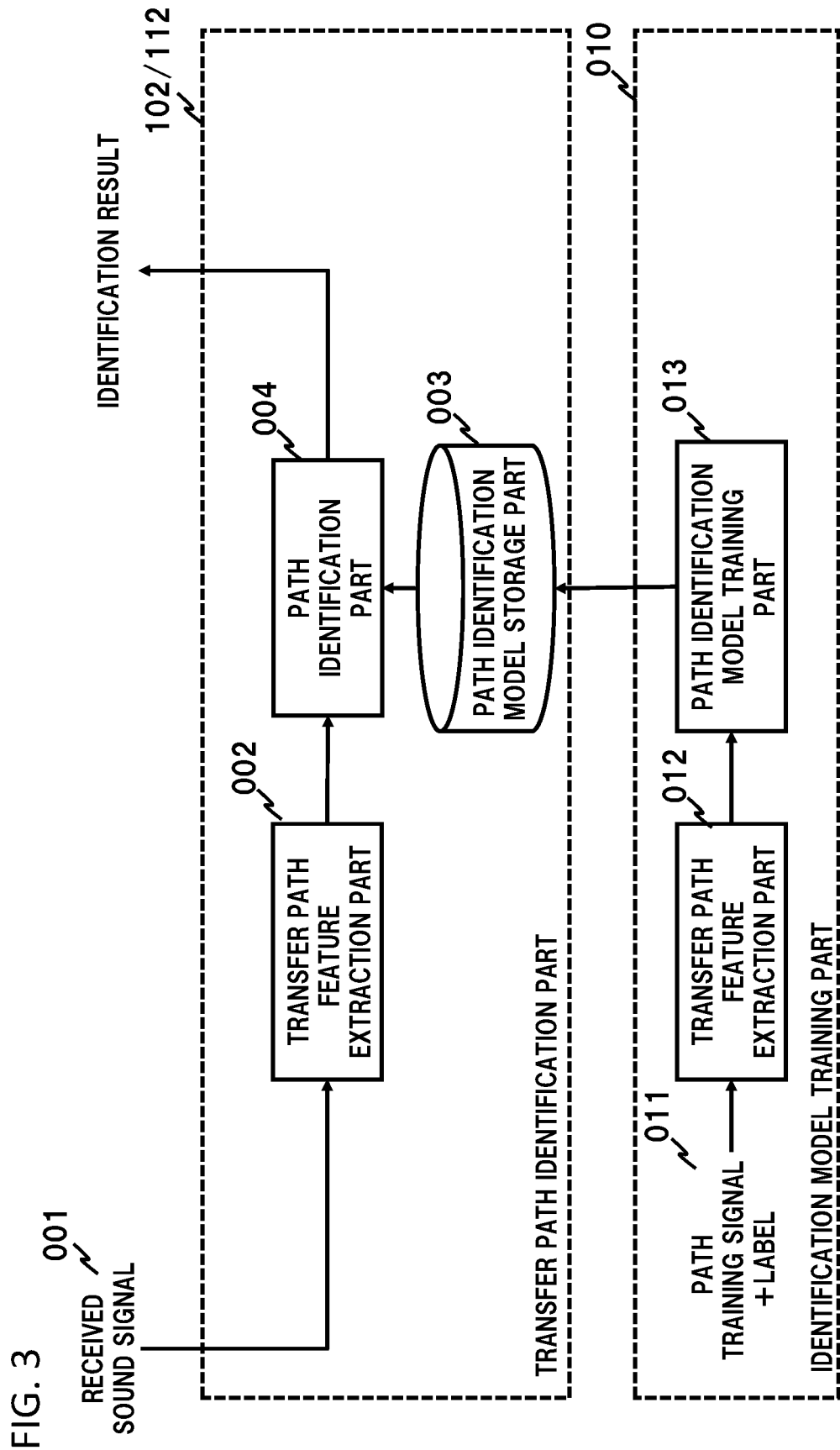
FIG. 3 is a diagram illustrating a configuration example of a transfer path identification part of a pattern recognition apparatus in the first exemplary embodiment of the present invention.

Here, it will be explained about a configuration which identifies a transfer path in the transfer path identification part 102 and transfer path identification part 112. FIG. 3 is a diagram illustrating a configuration example of the transfer path identification part 102/112 of the pattern recognition apparatus 100 in the first exemplary embodiment of the present invention.

Referring to FIG. 3, a configuration of the transfer path identification part 102/112 including a transfer path feature extraction part 002, path identification model storage part 003, and path identification part 004 is illustrated.

The transfer path feature extraction part 002 receives, as input, a received sound signal 001, and calculates and outputs a transfer path feature.

The path identification part 004 identifies a transfer path, based on the transfer path feature output from the transfer path feature extraction part 002, and based on a path identification model stored in the path identification model storage part 003.

In the lower side of FIG. 3, a configuration of an identification model training part 010 which generates the above path identification model is illustrated. A transfer path feature extraction part 012, receives, as input, a pair 011 of a signal for path training and its label, that is, a supervised training signal, and calculates and outputs a feature of a transfer path.

A path identification model training part 013 learns a path identification model based on the transfer path feature output from the transfer path feature extraction part 012.

Operations of the above transfer path identification part 102/112 and identification model training part 010 are as follows. Firstly, a pair (combination) 011 of the signal for path training and its label c is input to the transfer path feature extraction part 012. The pair of this signal for path training and its label c can be represented as "y_train (t, c)".

Here, the label c means a label for identifying a transfer path of y_train (t, c). For example, a transfer path of an acoustic signal which has propagated in air can be defined as c=air, a transfer path which has propagated in wood can be defined as c=wood, a transfer path which has propagated in metal can be defined as c=metal. In this case, the pair y_train (t, wood) of the signal for path training and its label c is a received sound signal in a case where the transfer path is in (through) wood. And, it can be said that a transfer path feature calculated from the pair y_train (t, wood) of the signal for path training and its label c represents a feature of a transfer path of the wood.

The transfer path feature extraction part 012 calculates a h_train (c) from the above y_train (t, c) and outputs the result to the path identification model training part 013. This h_train (c) is the aforementioned transfer path feature vector.

The path identification model training part 013 inputs the transfer path feature vector h_train (c) and generates an identification model M of a transfer path. This identification model M functions as a multi-class classifier which inputs the transfer path feature vector and outputs a label c. Further, the identification model M may use an arbitrary model such as mixed Gaussian distribution, a support vector machine, a neural network, or the like.

Each part of the transfer path identification part 102/112 operates as follows.

The received sound signal 001 is input to the transfer path feature extraction part 002. Here, the received sound signal is described as "x(t)".

The transfer path feature extraction part 002 calculates a transfer path feature vector h from the received sound signal x(t) and outputs it to the path identification part 004.

The path identification part 004 identifies a transfer path based on a path identification model(s) stored in the path identification model storage part 003 and outputs an identification result of the transfer path. This identification result becomes the aforementioned transfer path label d.

As explained above, the pattern recognition apparatus 100 in the present exemplary embodiment identifies the transfer path of the acoustic signal and switches the model to be used in the pattern recognition. Therefore, pattern recognition is robustly possible even in an environment in which different transmission paths are included. Namely, it is possible to realize pattern recognition accuracy robust to influence of the transfer path and at a higher accuracy.

Further, in the above explanation, though it is assumed that the transfer path identification part 102 and model training part 103 are not included in the pattern recognition apparatus 100, the pattern recognition apparatus 100 may include the transfer path identification part 102 and model training part 103. By adopting such the configuration, it is possible to perform training with a detection result of the pattern recognition apparatus 100 further as a training data, and to update a model.

Second Exemplary Embodiment

Next, it will be explained about a pattern recognition apparatus 200 according to a second exemplary embodiment of the present invention in which it is possible to omit switching-over of the model in the above first exemplary embodiment by using FIG. 4.

Figure 4:
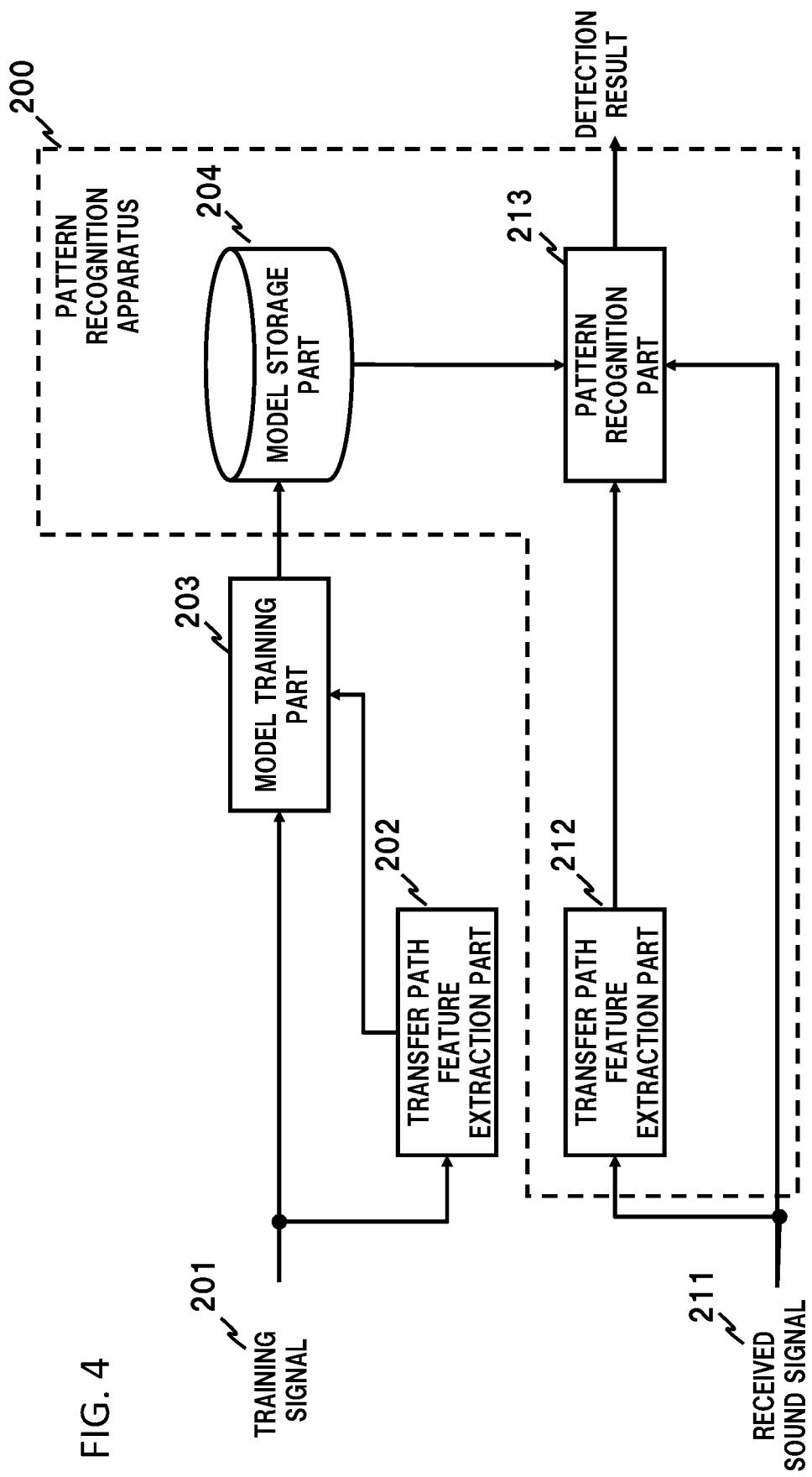
FIG. 4 is a diagram illustrating a configuration of a pattern recognition apparatus in a second exemplary embodiment of the present invention.

FIG. 4 is a diagram illustrating a configuration of the pattern recognition apparatus in the second exemplary embodiment of the present invention. Referring to FIG. 4, a configuration including a configuration which includes a transfer path feature extraction part 202, model training part 203 and model storage part 204 and generates a model(s) for pattern recognition from a training signal(s), and the pattern recognition apparatus 200 (refer to within a broken line) which performs the pattern recognition by using this model(s) is illustrated. Hereinafter, the configuration which includes the transfer path feature extraction part 202, model training part 203, and model storage part 204 and generates the model(s) for pattern recognition from the training signal is also referred to as "training part".

The pattern recognition apparatus 200 is configured by including a transfer path feature extraction part 212, pattern recognition part 213, and model storage part 204.

The training signal 201 is an acoustic signal for generating a model for pattern recognition and inputs to each of the transfer path feature extraction part 202 and model training part 203. The training signal 101 can be represented as a "x_train (t, n)".

The transfer path feature extraction part 202 calculates a transfer path feature vector h_train (t, n) of the training signal x_train (t, n) and outputs it to the model training part 203.

The model training part 203 generates a model P for pattern recognition by using the h_train, additional to the training signal x_train (t, n).

Since the model training part 203 uses not only the x_train (t, n) but also the transfer path feature vector h_train (t, n) as a feature value for generating the model for pattern recognition, the model training part 203 generates a model [P] in consideration of information of a transfer path of the x_train (t, n). The model storage part 204 stores the model P generated by the model training part 203.

The model P using h_train in the second exemplary embodiment can be generated as follows. For example, the model P can be generated by applying a connected vector [g, h] as a new feature vector, to a feature vector g obtained by the training signal x_train (t, n), whereby it is possible to generate a model in consideration of the transfer path feature vector h_train. Further, in place of the above scheme, the model P may be generated by replacing the transfer path feature vector h_train with prior distribution of the training signal x_train or a distribution parameter with a condition.

To continue, it will be explained about operation of each part of the pattern recognition apparatus 200 performing pattern recognition by using the above model.

A received sound signal 211 is input to each of the transfer path feature extraction part 212 and pattern recognition part 213. Hereinafter, the received sound signal 211 is also described as "x(t)".

The transfer path feature extraction part 212 calculates a transfer path feature vector h of the received sound signal x(t) and outputs it to the pattern recognition part 213.

The pattern recognition part 213 inputs the received sound signal x(t) and the transfer path feature vector h, and performs pattern recognition regarding the x(t), and outputs a result.

As explained above, in the present exemplary embodiment, the transfer path feature vector of the acoustic signal is used as an auxiliary feature value and the model for pattern recognition is generated. Therefore, the pattern recognition is robustly possible even in an environment in which different transmission paths are included. Namely, it is possible to realize a pattern recognition accuracy robust to influence of the transfer path at a higher accuracy.

Third Exemplary Embodiment

Next, it will be explained about a pattern recognition apparatus 300 configured such that a transfer path feature vector h is used for model correction in a third exemplary embodiment of the present invention by using FIG. 5.

Figure 5:
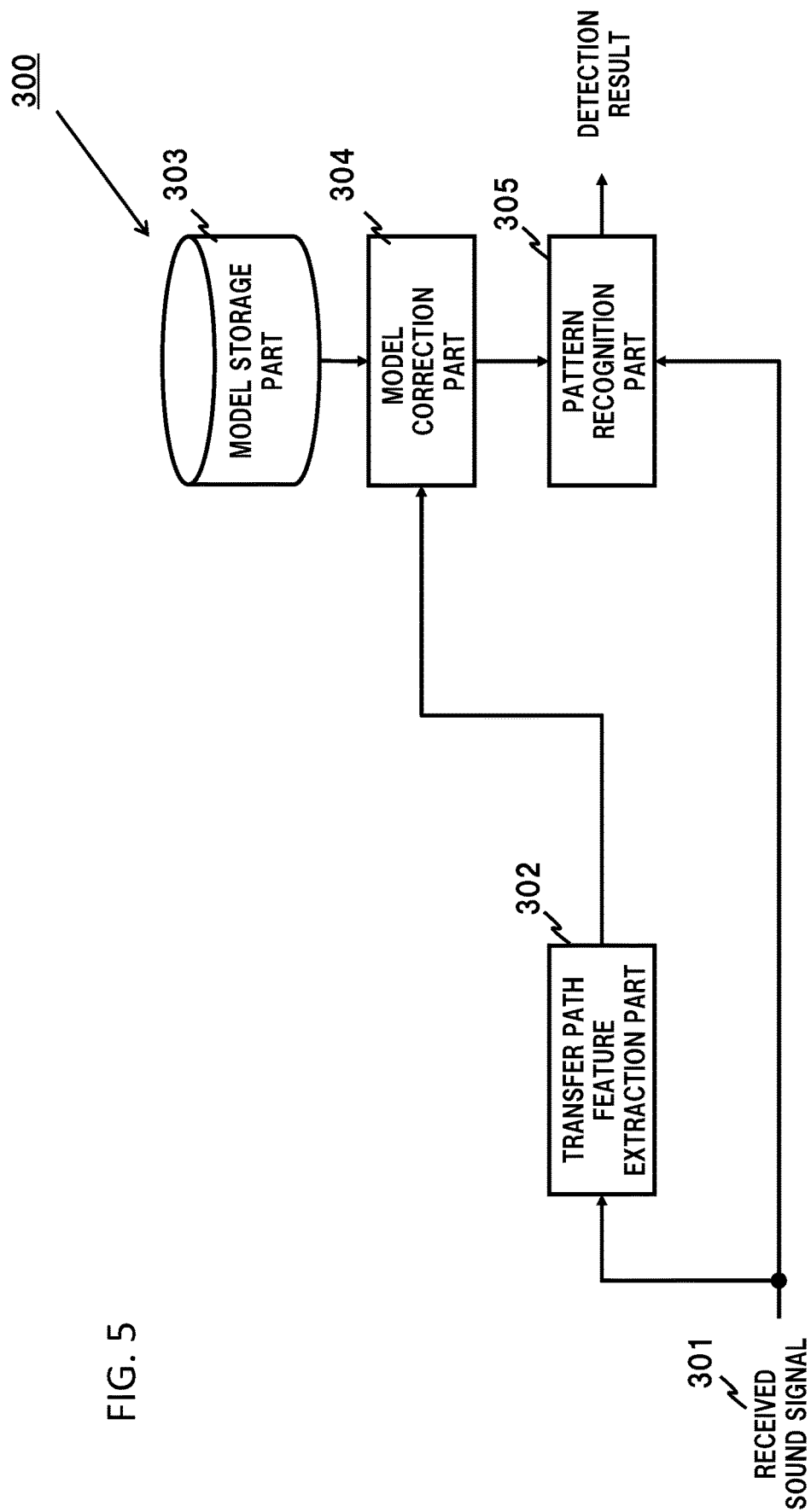
FIG. 5 is a diagram illustrating a configuration of a pattern recognition apparatus in a third exemplary embodiment of the present invention.

FIG. 5 is a diagram illustrating configuration of the pattern recognition apparatus in the third exemplary embodiment of the present invention. Referring to FIG. 5, the pattern recognition apparatus 300 including a model storage part 303, transfer path feature extraction part 302, model correction part 304, and pattern recognition part 305 which performs pattern recognition by using a corrected model is illustrated. Further, in FIG. 5, though a configuration equivalent to the training part in the first and second exemplary embodiments is omitted, a model training part which generates a model to be stored in the model storage part 303 may be included, receiving a training signal as input.

A received sound signal 301 is input to the transfer path feature extraction part 302 and pattern recognition part 305. Hereinafter, the received sound signal 301 is also described as "x(t)".

The transfer path feature extraction part 302 calculates a transfer path feature vector h of the received sound signal x(t) and inputs it to the model correction part 304.

The model correction part 304 corrects a model P stored in the model storage part 303 based on the transfer path feature vector h, and outputs a corrected model P_new. The transfer path feature vector h is a feature representing a change of frequency characteristic of a signal through a transfer path. When pattern recognition of the received sound signal x(t) is performed, influence of the transfer path is included in the received sound signal x(t). In other words, a deviation equivalent to the transfer path feature vector h on [in] a feature value space occurs in the received sound signal x(t) when performing pattern recognition. Therefore, the model correction part 304 corrects the model P only by an amount of the deviation. Hereinafter, its principle will be explained by using a case where an acoustic feature value regarding x(t) used in the model P is a frequency spectrum, as an example.

If the Fourier transform of the received sound signal x(t) is expressed as "F(x(t))", the following [Expression 2] (reshown) is rewritten such as [Expression 3] due to definition of the Fourier transform.

$$x(t) = \sum_{\tau=0}^{T} h(\tau)s(t - \tau) \qquad \text{[Expression 2]}$$

$$F(x(t)) = F(h)F(s(t)) \qquad \text{[Expression 3]}$$

That is, it can be said that a deviation by the amount of F(h) is present in the received sound signal x(t) in the feature value space. Therefore, by adding linear transformation by the amount of F(h) to a parameter of the model P, it is possible to correct the model P and obtain the model P_new from which the deviation is removed.

The pattern recognition part 305 inputs the received sound signal x(t), and performs pattern recognition regarding x(t) based on the corrected model P_new, and outputs a result.

Here, the model P stored in the model storage part 303 is a model learned by using a training signal such that there is no influence of a transfer characteristic h, that is, by using a sound source signal s(t). Here, in a case where any transfer path characteristic h2 has already been added to the training signal used in the generation of the model P, the new model P_new is obtained by correcting the model P, that is, by using a difference between a characteristic of the transfer path characteristic h2 and a characteristic of h, namely, by using F(h)–F(h2).

As explained above, in the present exemplary embodiment, the model P is corrected by using the transfer path feature vector h of the acoustic signal. Therefore, pattern recognition is robustly possible even in an environment in which different transmission paths are included. Namely, it is possible to realize a pattern recognition accuracy robust to influence of the transfer path at a higher accuracy.

Fourth Exemplary Embodiment

Next, it will be explained about a pattern recognition apparatus 400 configured such that an input signal is corrected by using a transfer path feature vector h, in a fourth exemplary embodiment of the present invention, by using FIG. 6.

Figure 6:
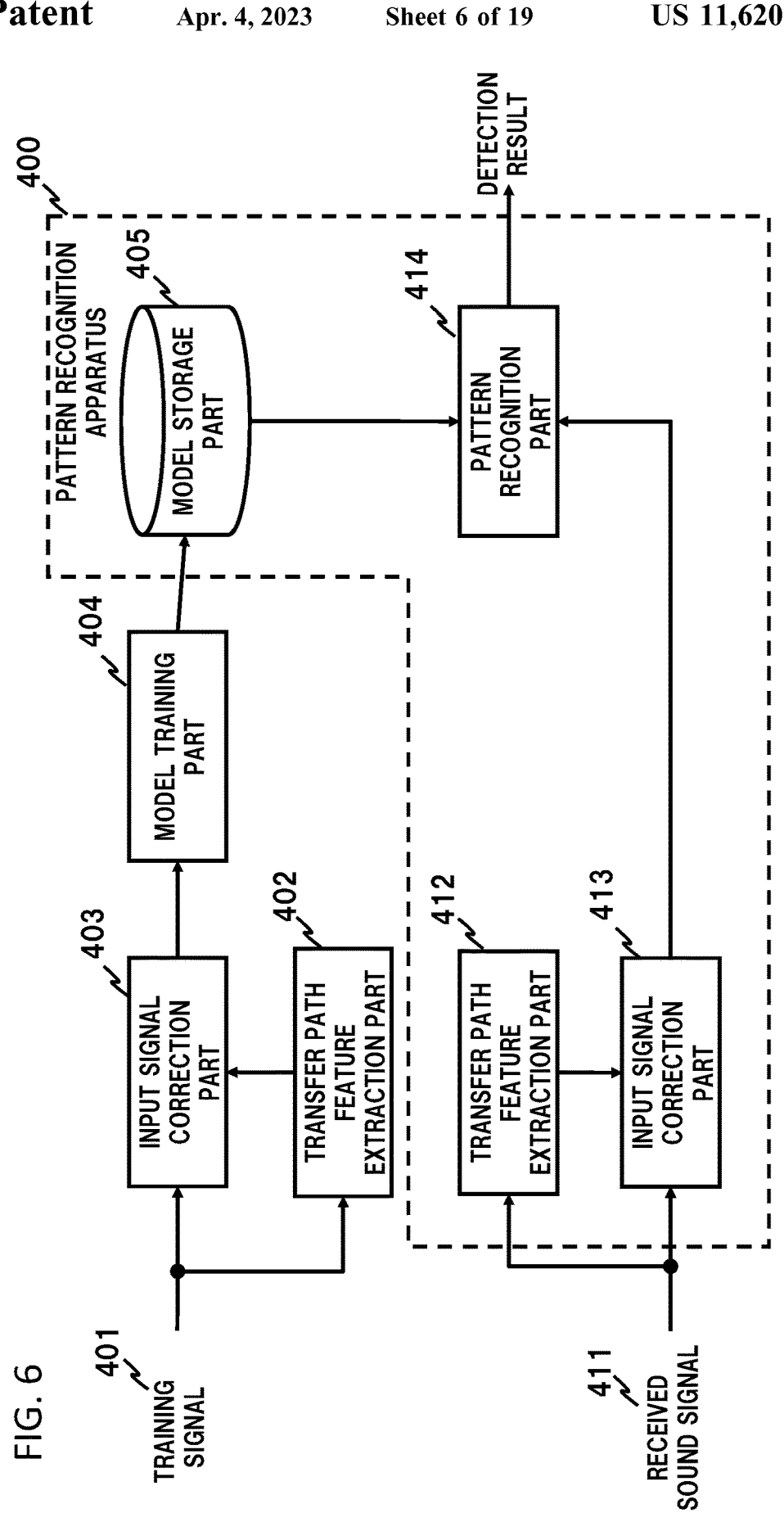
FIG. 6 is a diagram illustrating a configuration of a pattern recognition apparatus in a fourth exemplary embodiment of the present invention.

FIG. 6 is a diagram illustrating a configuration of the pattern recognition apparatus in the fourth exemplary embodiment of the present invention. Referring to FIG. 6, a configuration including a configuration which includes a transfer path feature extraction part 402, input signal correction part 403, model training part 404, and model storage part 405 and generates a model(s) for pattern recognition from a training signal, and the pattern recognition apparatus 400 (refer to within a broken line) which performs the pattern recognition by using this model(s) is illustrated. Hereinafter, the configuration which includes the transfer path feature extraction part 402, input signal correction part 403, model training part 404, and model storage part 405 and generate the model(s) for the pattern recognition from the training signal is also referred to as a "training part".

The pattern recognition apparatus 400 is configured by including a transfer path feature extraction part 412, input signal correction part 413 pattern recognition part 414, and the model storage part 405.

A training signal 401 is an acoustic signal for generating a model for the pattern recognition at a post-stage. Hereinafter, the training signal 401 is described also as "x_train (t, n)".

The transfer path feature extraction part 402 calculates a transfer path feature vector h_train of the training signal x_train (t, n) and outputs it to the input signal correction part 403.

The input signal correction part 403 corrects the training signal x_train (t, n) based on the transfer path feature vector h_train, and outputs a new signal x_train_new (t, n). Similar to the aforementioned received sound signal x(t), the training signal x_train (t, n) is represented by the following formula [Expression 4] and change of a frequency characteristic has occurred by the h_train.

$$x_{train}(t, n) = \sum_{\tau=0}^{T} h_{train}(\tau)s(t - \tau, n) \qquad \text{[Expression 4]}$$

Therefore, by multiplying the training signal x_train (t, n) by an inverse filter such as ones having an opposite characteristic to the transfer path feature vector h_train, it is possible to cancel its change. Regarding an inverse filter of FIR filter, an arbitrary scheme may be used. Further, correction may be represented by a frequency domain, and a convolution term is represented by the following [Expression 5] as a product.

$$F(x_{train}(t, n)) = F(h_{train})F(s(t, n))$$ [Expression 5]

Here, when an inverse filter of the transfer path feature vector h_train is represented as (h_train)$^{-1}$ and an inverse characteristic of F(h_train) is represented as F(h_train)$^{-1}$, [Expression 5] is rewritten as [Expression 6].

$$F(x_{train\_new}(t, n)) = F(h_{train})_{-1} F(x_{train}(t, n))$$ [Expression 6]

The x_train_new (t, n) of the above [Expression 6] which is a corrected training signal is output to the model training part 404.

The model training part 404 generates a model P by using the corrected training signal x_train_new (t, n). The model training part 404 generates a model by using the x_train_new which is a signal obtained by cancelling the change of the frequency characteristic by the transfer path feature vector h_train of the training signal x_train (t, n). Therefore, it is possible to generate a model without being influenced by a transfer path.

The model storage part 405 stores the model P output by the model training part 404. This model P is generated by using the training signal corrected by using the transfer path feature vector h_train of the acoustic signal. Therefore, it is possible to generate a model without being influenced by a transfer path even when a training signal such that different transfer paths are included is used.

To continue, it will be explained about operation of each part of the pattern recognition apparatus 400 performing pattern recognition by using the above model. A received sound signal 411 is input to each of the transfer path feature extraction part 412 and input signal correction part 413. Hereinafter, the received sound signal 411 is described also as "x(t)".

The transfer path feature extraction part 412 and input signal correction part 413 correct the received sound signal x(t) similarly to the transfer path feature extraction part 402 and input signal correction part 403, and outputs a corrected received sound signal x_new(t) to the pattern recognition part 414. The pattern recognition part 414 inputs the corrected received sound signal x_new_(t), performs pattern recognition regarding the x_new(t), and outputs a result. The above pattern recognition part 414 performs a pattern recognition process to a signal corrected by using the transfer path feature vector of the acoustic signal similarly to a generation process of the above model. Therefore, pattern recognition is possible without being influenced by a transfer path even with respect to a signal such that different transfer path(s) is included.

As explained above, in the present exemplary embodiment, also in a generation process of a model for pattern recognition, the model is learned by using the training signal corrected by using the transfer path feature vector of the acoustic signal. Therefore, pattern recognition can be performed without being influenced by a transfer path even when a training signal such that different transfer paths are included is used.

In addition, since the pattern recognition process is performed onto the signal corrected by using the transfer path feature vector of the acoustic signal, pattern recognition is possible without being influenced by a transfer path even with respect to a signal such that different transfer paths are included.

Namely, in the configuration of present exemplary embodiment, it is also possible to realize pattern recognition accuracy robust to influence of a transfer path at a higher accuracy.

Fifth Exemplary Embodiment

Next, it will be explained about a pattern recognition apparatus 500 in a fifth exemplary embodiment of the present invention, by using FIG. 7.

Figure 7:
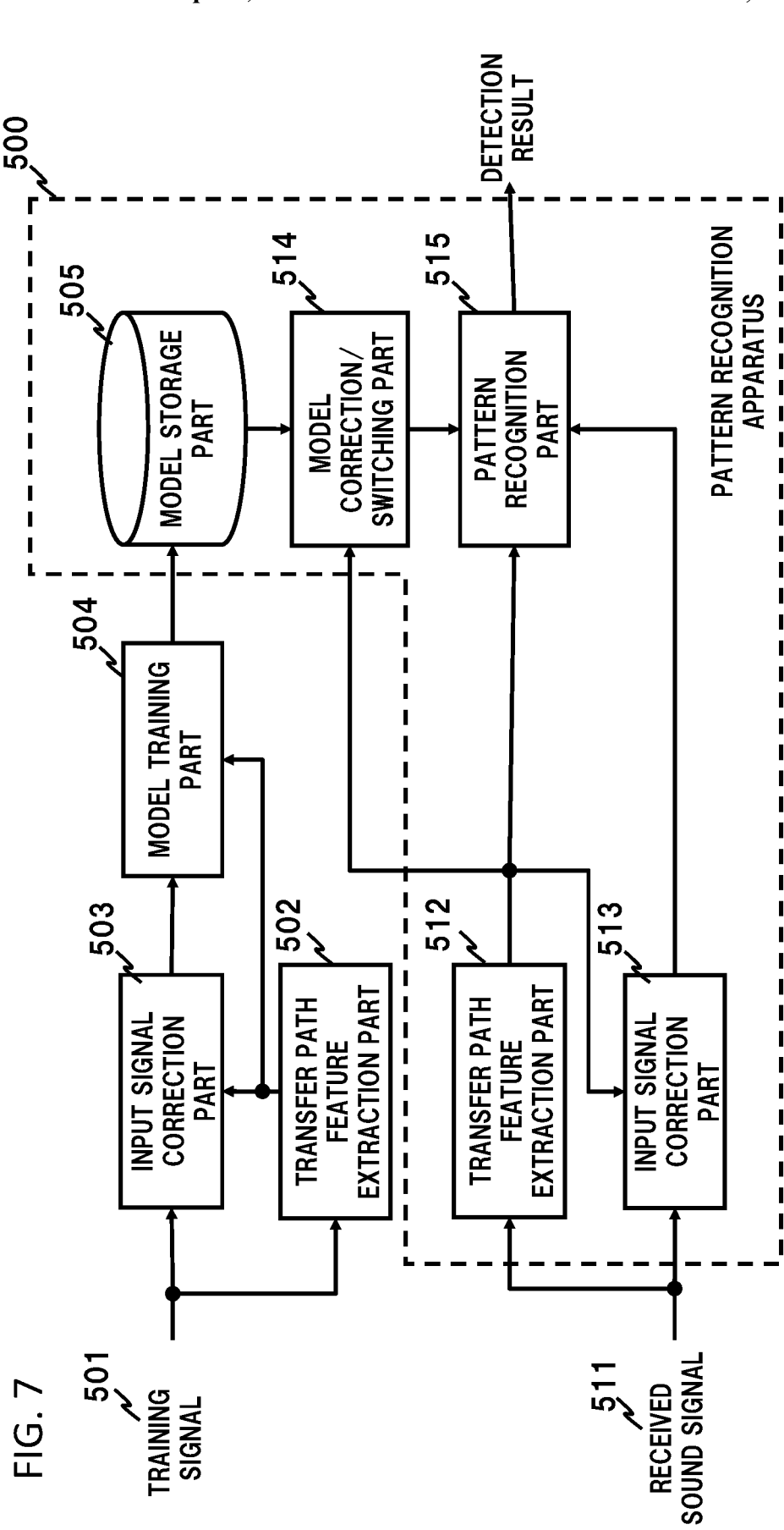
FIG. 7 is a diagram illustrating a configuration of a pattern recognition apparatus in a fifth exemplary embodiment of the present invention.

FIG. 7 is a diagram illustrating a configuration of the pattern recognition apparatus in the fifth exemplary embodiment of the present invention. Referring to FIG. 7, a configuration including a configuration which includes a transfer path feature extraction part 502, input signal correction part 503, model training part 504, and model storage part 505 and generates a model for pattern recognition from a training signal, and the pattern recognition apparatus 500 (refer to within a broken line) which performs the pattern recognition by using this model is illustrated. Hereinafter, the configuration which includes the transfer path feature extraction part 502, input signal correction part 503, model training part 504, and model storage part 505 and generates the model for the pattern recognition from the training signal is referred to as a "training part".

This fifth exemplary embodiment is an exemplary embodiment that all of the configurations in the first to fourth exemplary embodiments are combined. Concretely, in the training part, correction of an input signal using a transfer path feature vector and correction of a model are performed. In addition, this model is generated for each of transfer paths by the transfer path grasped from the transfer path feature vector, and each model includes the transfer path feature vector as a feature value.

Operation of the pattern recognition apparatus 500 is also a combination of the above, and the pattern recognition apparatus 500 selects a model corresponding to the transfer path by the transfer path grasped from the transfer path feature vector. And, the pattern recognition apparatus 500 performs correction of a received sound signal using the transfer path feature vector and correction of the model, and there after the pattern recognition apparatus 500 performs pattern recognition including the transfer path feature vector.

By adopting the configuration combined with the first to fourth arbitrarily as above, it is possible to perform more robust pattern recognition. Further, in the explanation of the above fifth exemplary embodiment, though it is explained as that all of the configurations of the above first to fourth exemplary embodiments are combined, there is no need to combine these all. For example, the first exemplary embodiment and any one or two of the second to fourth exemplary embodiments may be combined. Similarly, the second exemplary embodiment and any one or two of the third and fourth exemplary embodiments may be combined. Similarly, the third and fourth exemplary embodiments can be combined with any one, two, or three of the other exemplary embodiments.

Sixth Exemplary Embodiment

Next, it will be explained about an integrated type pattern recognition apparatus 600 in a sixth exemplary embodiment of the present invention, by using FIG. 8.

Figure 8:
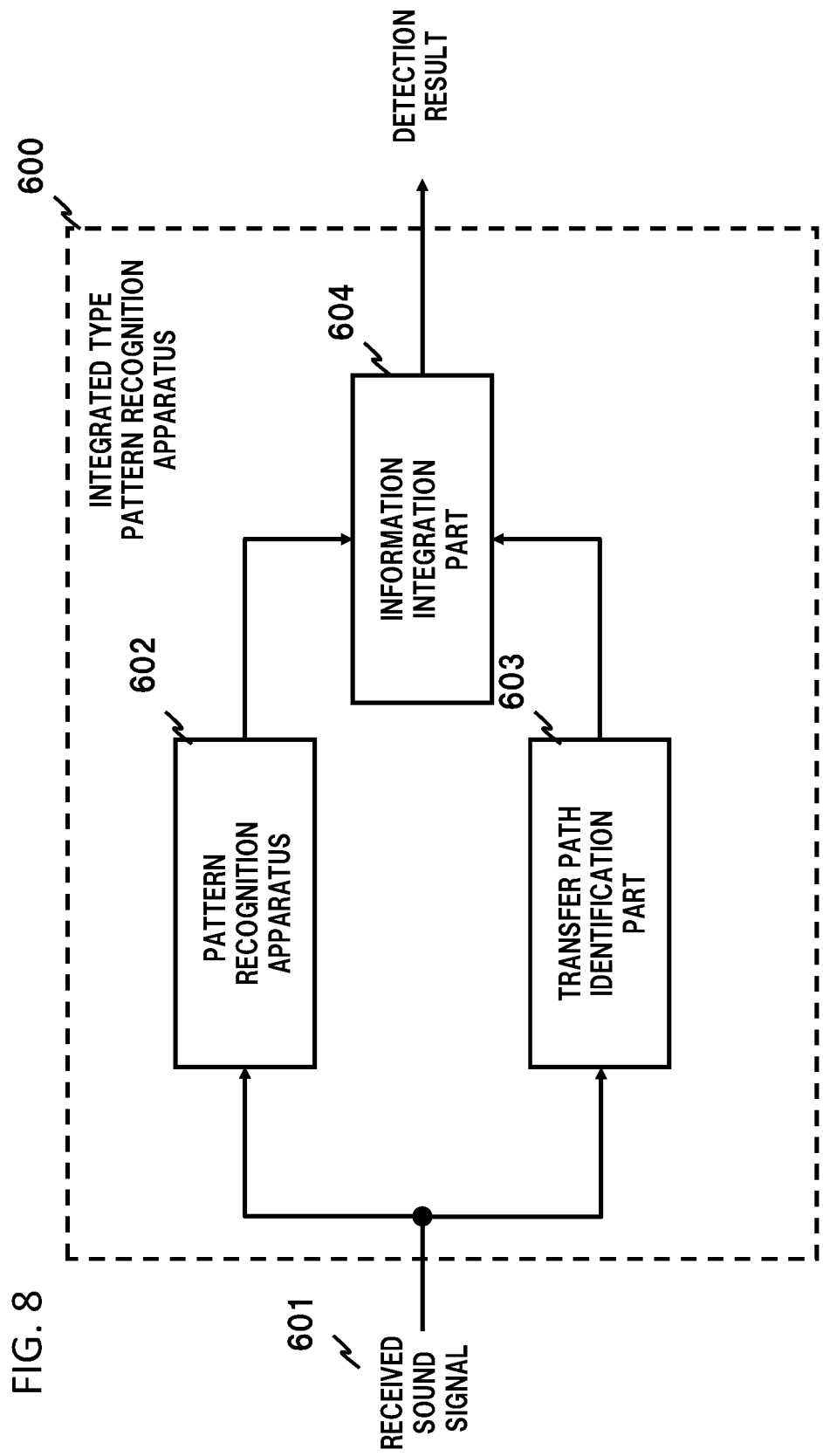
FIG. 8 is a diagram illustrating a configuration of a pattern recognition apparatus in a sixth exemplary embodiment of the present invention.

FIG. 8 is a diagram illustrating a configuration of the pattern recognition apparatus in the sixth exemplary embodiment of the present invention. Referring to FIG. 8, a configuration is illustrated in which a second transfer path identification part 603 in parallel with a pattern recognition apparatus 602 is arranged and each output is input to an information integration part 604.

A received sound signal 601 is input to the pattern recognition apparatus 602 and the second transfer path identification part 603. Hereinafter, the received sound signal 601 is also described as "x(t)".

The pattern recognition apparatus 602 can use an arbitrary pattern recognition apparatus including the above first to fifth exemplary embodiments. Therefore, the pattern recognition apparatus 602 performs pattern recognition regarding the received sound signal x(t) and outputs a recognition result n. The recognition result n indicates a pattern of an acoustic signal such as "voice", "music", or the like, for example.

The second transfer path identification part 603 identifies a transfer path of the received sound signal x(t) and outputs an identification result (label) c. This identification result c indicates what kind of the transfer path x(t) passes through, for example, such as "wood", "metal", or the like and is received as voice. Further, when a transfer path identification part for model switching is included in the pattern recognition apparatus 602 side, it is possible to use this transfer path identification part as the second transfer path identification part 603.

The information integration part 604 inputs the above recognition result n and identification result c, and outputs integrated information. For example, there are "voice propagated through the air", "music propagated through wood", or the like, as examples.

Here, a further processing may be added at a post-stage depending on the result of integrated information. For example, it is considered about a case where two rooms A and B blocked by a wood wall are assumed and the integrated type pattern recognition apparatus 600 is arranged as a preceding stage of a voice detection apparatus operating in the room A. In this case, the integrated type pattern recognition apparatus 600 performs pattern recognition of n={voice, others}, c={air, wood}. In this case, an output of the information integration part 604 may be "voice propagated in the air", "voice propagated in the wood", or the like. Here, when an installation purpose of the integrated type pattern recognition apparatus 600 installed in the room A is for voice detection of a human inside the room A, a voice of a human inside the room B propagating via wood or metal which configures a partition of the room(s) becomes information excluded from a target of detection. In such a case, even though the received sound signal x(t) be voice, by using an output result of the information integration part 604, pattern recognition at a finer granularity is possible, such as excluding from a target of pattern recognition depending on its transfer path, performing pattern recognition about a voice detected in the room A on the contrary, or the like.

As explained above, in the present exemplary embodiment, it is possible to realize pattern identification at a finer granularity, by integrating the identification result of the transfer path of the acoustic signal with the pattern identification result of the acoustic signal.

Seventh Exemplary Embodiment

Figure 9:
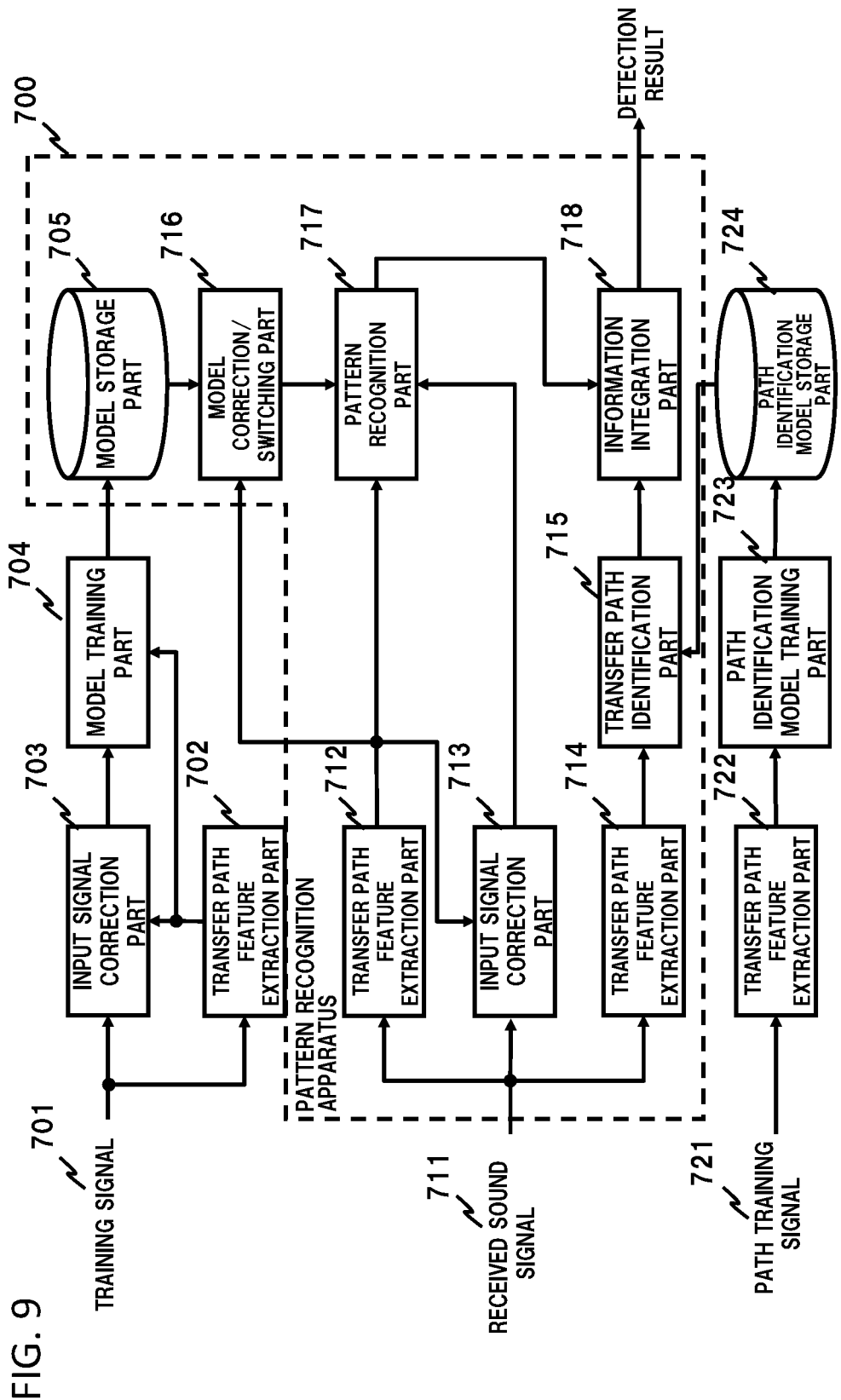
FIG. 9 is a diagram illustrating a configuration of a pattern recognition apparatus in a seventh exemplary embodiment of the present invention.

Further, it is also possible to add a configuration equivalent to the identification model training part described in FIG. 3, to the configuration of this sixth exemplary embodiment. FIG. 9 is a diagram illustrating a modified configuration of the pattern recognition apparatus in the seventh exemplary embodiment of the present invention. Referring to FIG. 9, in the lower side of a pattern recognition apparatus 700 in which a part(s) equivalent to training part of the upper side and an information integration part 718 is (are) incorporated, a transfer path feature extraction part 722, path identification model training part 723, and path identification model storage part 724 by which the identification model training part is constructed are added. Since these are the same as explanation of the first exemplary embodiment, explanation is omitted.

Regarding the pattern recognition apparatus 700, a configuration is such that a transfer path feature extraction part 714 and (second) transfer path identification part 715 is added to the configuration of the fifth exemplary embodiment illustrated in FIG. 7, and the information integration part 718 is installed in its post-stage. This configuration is equivalent to the sixth exemplary embodiment that output from a pattern recognition part 717 and output from the transfer path identification part 715 are input to the information integration part 718, and the information integration part 718 performs integrated decision. Therefore, the configuration in FIG. 9 is a configuration that the transfer path feature extraction part 722, path identification model training part 723, and path identification model storage part 724 configuring separately the model training part are added to the configuration of the sixth exemplary embodiment. Since these elements have already been explained in the each of the above exemplary embodiments, explanation is omitted.

Eighth Exemplary Embodiment

Figure 10:
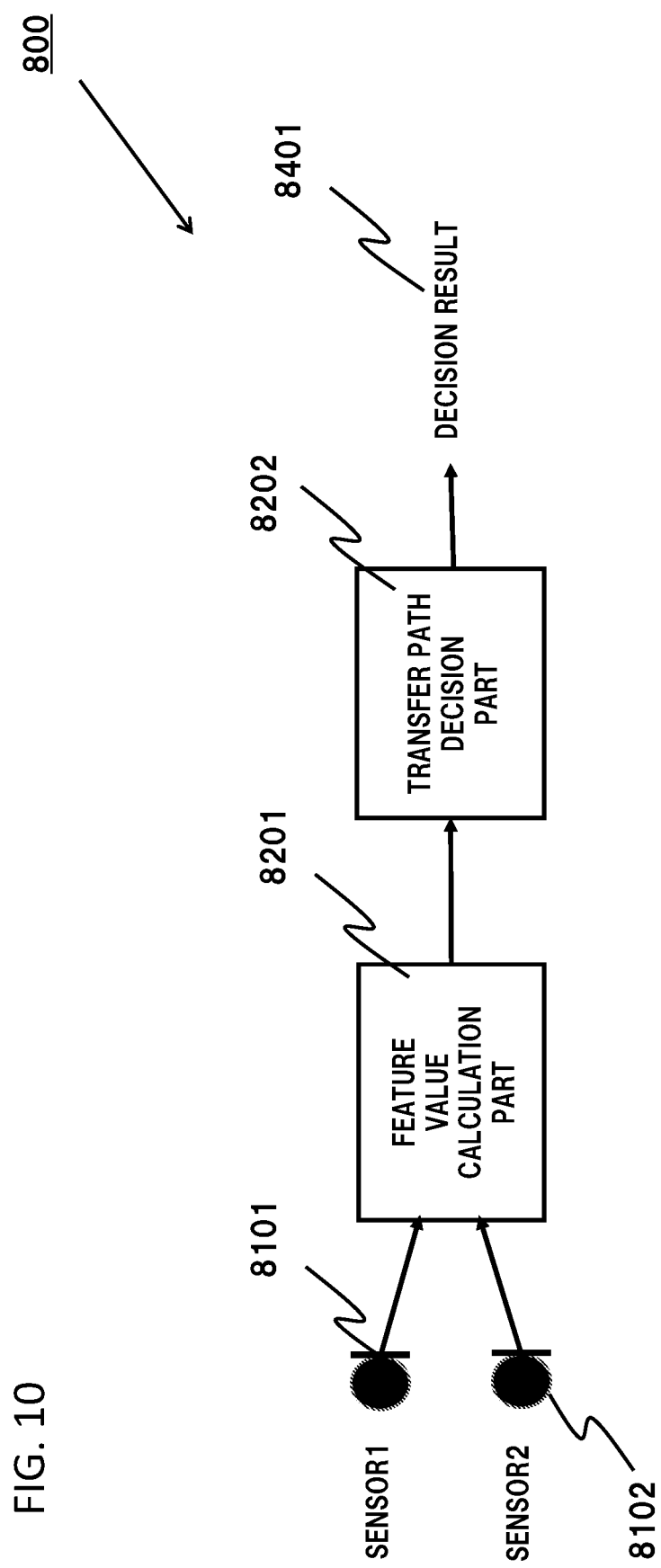
FIG. 10 is a diagram illustrating a configuration example of a transfer path identification part of a pattern recognition apparatus in an eighth exemplary embodiment of the present invention.

To continue, it will be explained about an eighth exemplary embodiment in which a transfer path can be identified without using a model in the transfer path identification part of the first, fifth, sixth, and seventh exemplary embodiments. FIG. 10 is a block diagram illustrating a configuration of a transfer path identification part in the eighth exemplary embodiment of the present invention. Referring to FIG. 10, a transfer path identification part 800 in the eighth exemplary embodiment of the present invention includes a plurality of sensors 8101 and 8102 (hereinafter, also described as a sensor 1, and sensor 2), feature value calculation part 8201, and transfer path decision part 8202.

Figure 11:
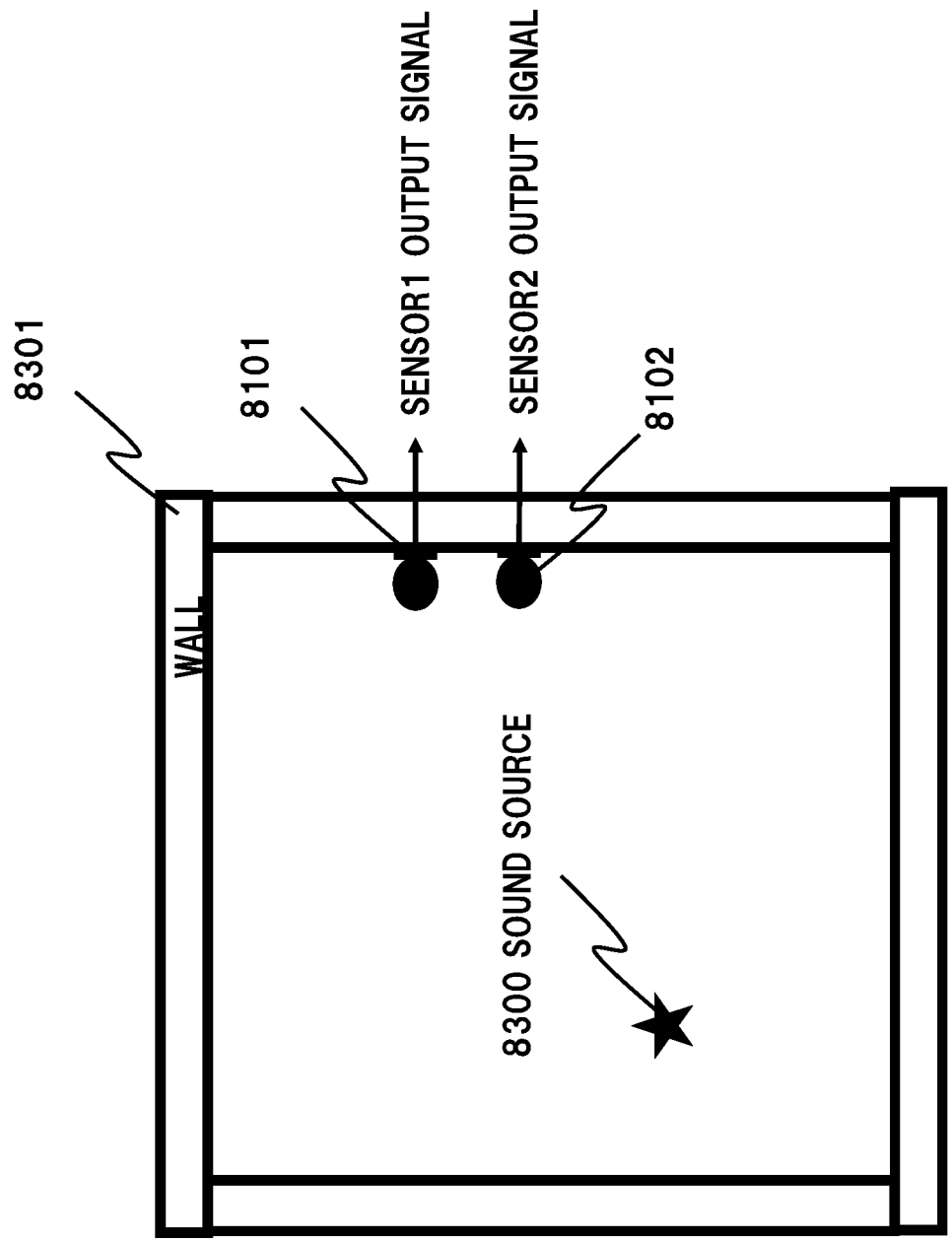
FIG. 11 is a diagram illustrating a relation to a sound source whose propagation path is in air in the eighth exemplary embodiment of the present invention.

These elements operate as following outlines respectively. The plurality of sensors 8101 and 8102 is fixed at a regular interval and obtains information of each received signal. One example of a scheme of fixing is that the sensors 8101 and 8102 are placed along a wall as illustrated in FIG. 11. In the present exemplary embodiment, it is assumed that outputs of the sensors 8101 and 8102 can be treated as a time sequence signal of a digital quantity.

The feature value calculation part 8201 calculates a feature value representing a space path required for signal arrival and transmission per each fixed time cycle from a signal(s) received by the sensors 8101 and 8102.

The transfer path decision part 8202 determines whether a signal being inputting to the sensor 8101 and 8102 propagated in air or in a solid body by using the feature value, and outputs a decision result 8401.

Figure 13:
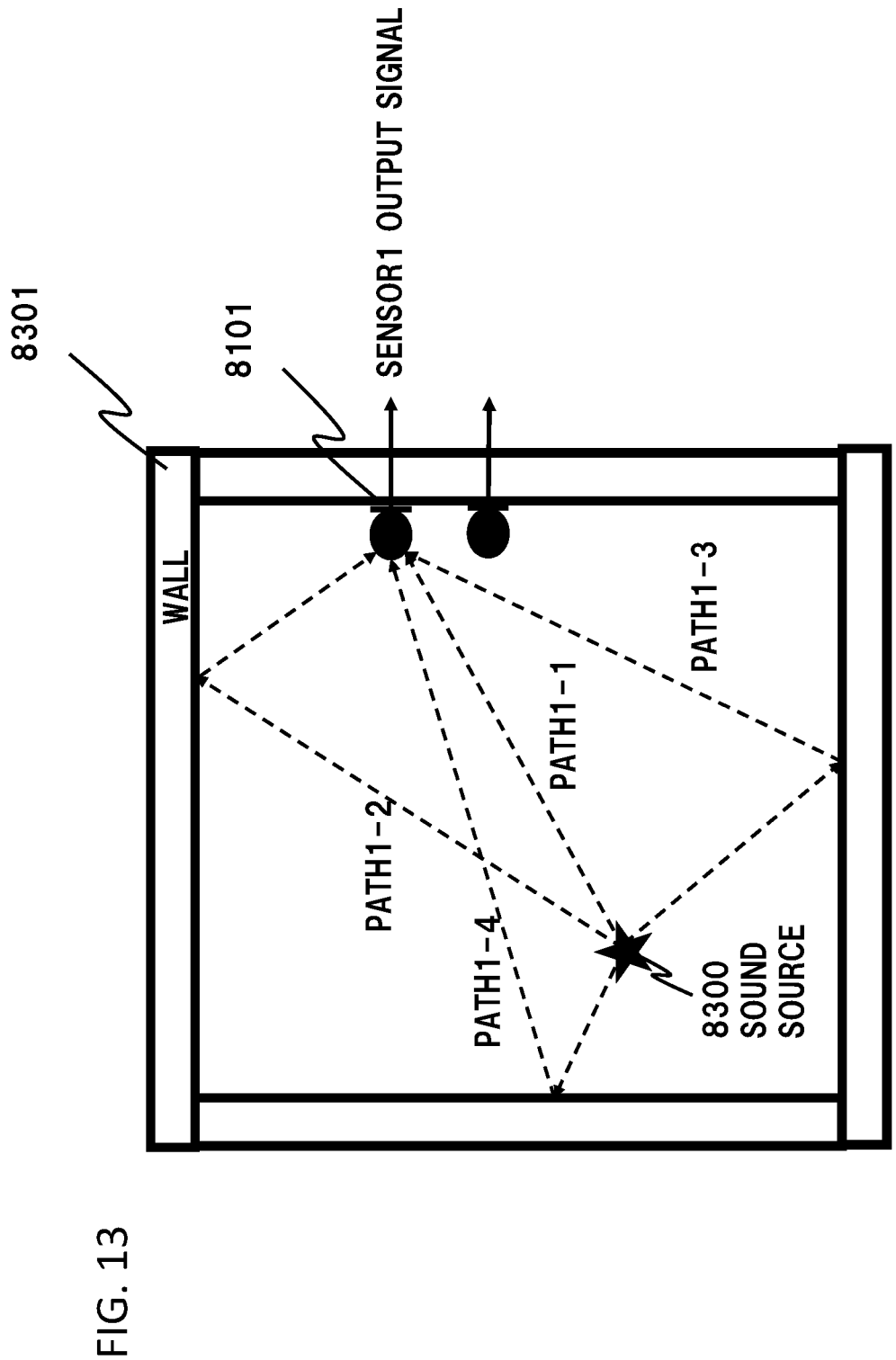
FIG. 13 is a diagram for explaining a path of sound reaching sensor 1 from the sound source whose propagation path is in the air in the eighth exemplary embodiment of the present invention.
Figure 14:
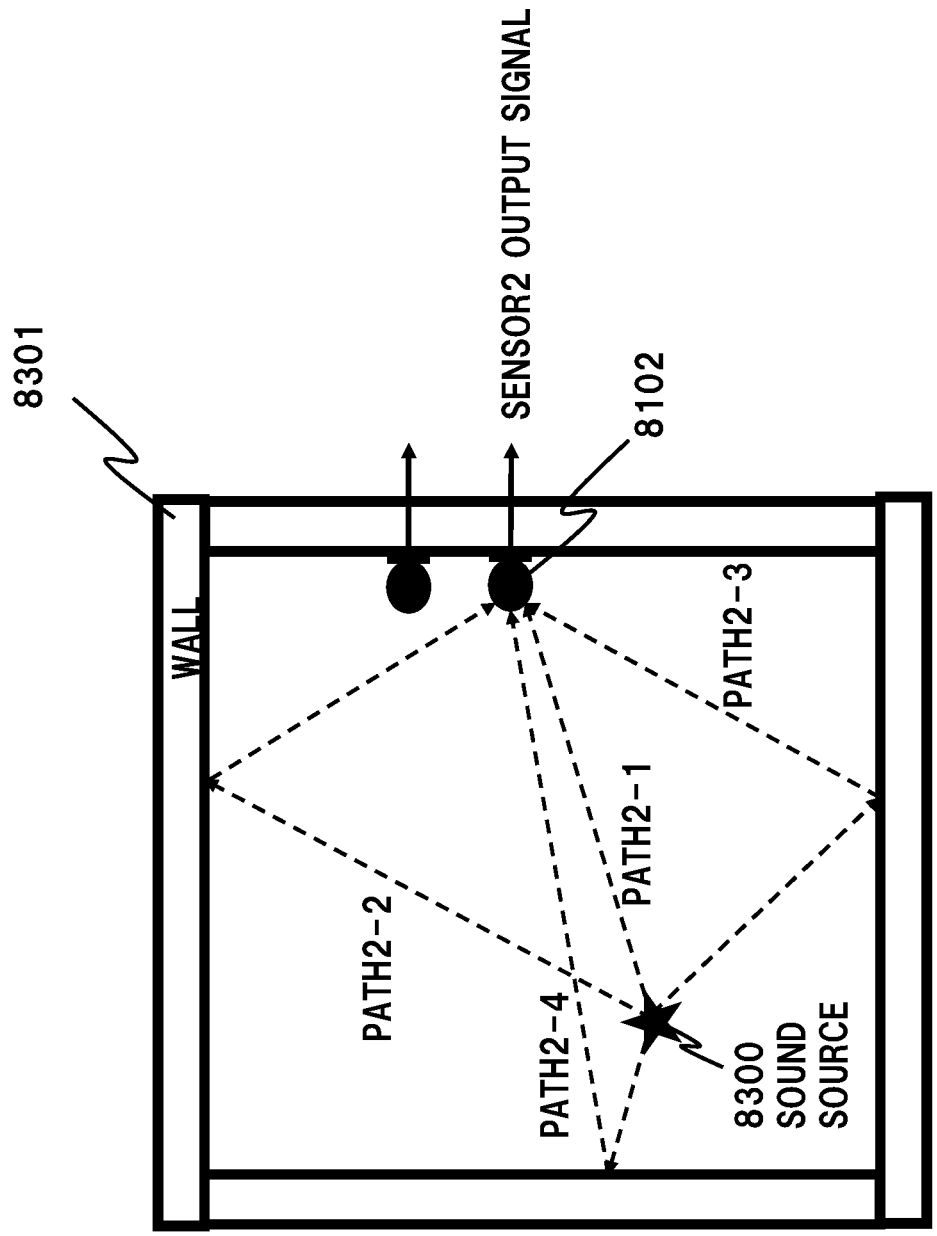
FIG. 14 is a diagram for explaining a path of sound reaching sensor 2 from a sound source whose propagation path is in the air in the eighth exemplary embodiment of the present invention.

Next, it will be explained about whole operations of the present exemplary embodiment, referring to FIGS. 10 to 16 in detail. Firstly, it will be explained about two events which are targets to be identified by a transfer path identification part in the present exemplary embodiment, that is, sound propagating in the air and sound propagating in the solid body by using FIGS. 11 to 16. The sound propagating in the air is a sound that is transmitted via the air present between a sound source 8300 and the sensors 8101 and 8102, as illustrated in FIG. 11. In this case, as illustrated in FIG. 13, there are a plurality of acoustic paths such as an acoustic path 1-2, acoustic path 1-3, acoustic path 1-4 or the like which are reflected sounds, other than an acoustic path 1-1 which is direct sound, as the acoustic paths arriving at the sensor 1 8101 from the sound source 8300. In this case, it is customary to be observed in the form of a mixture of sounds that have passed through these acoustic paths in the sensor 1 as a receiving point. Similarly, as illustrated in FIG. 14, acoustic paths arrived at the sensor 2 8102 from the sound source 8300 are also observed.

Figure 12:
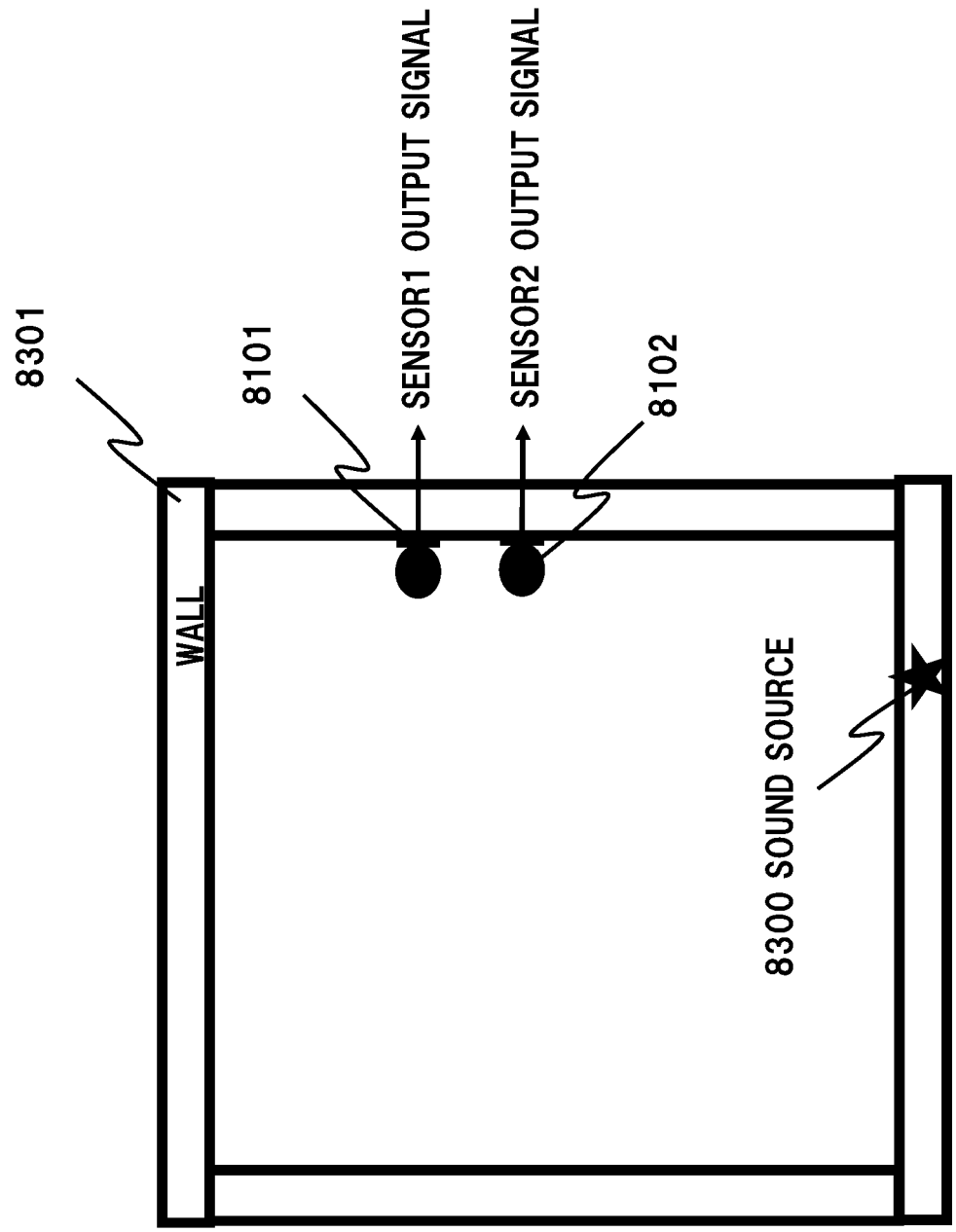
FIG. 12 is a diagram illustrating relation to a sound source whose propagation path is in a solid body in the eighth exemplary embodiment of the present invention.
Figure 15:
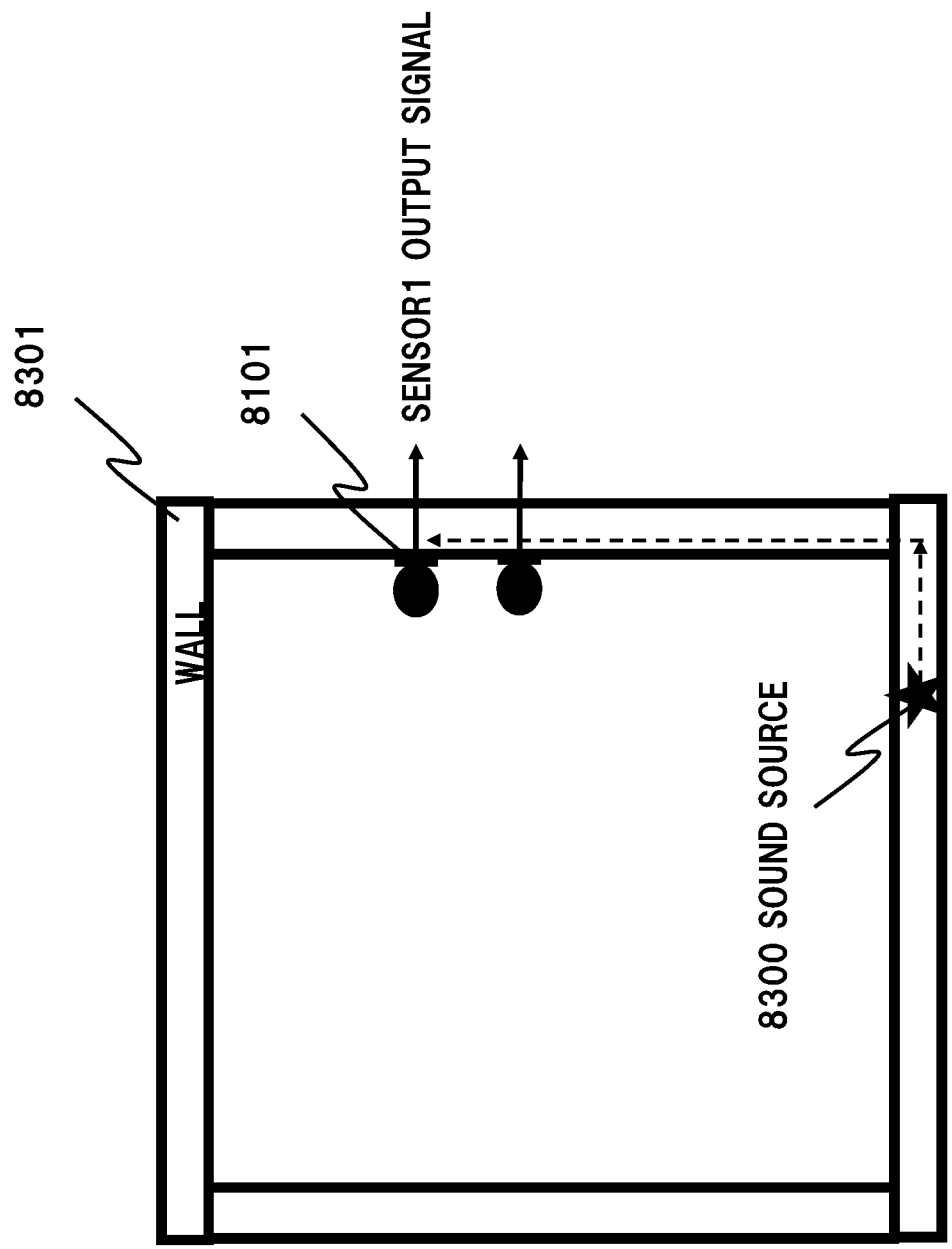
FIG. 15 is a diagram for explaining a path of sound reaching sensor 1 from a sound source whose propagation path is in the solid body in the eighth exemplary embodiment of the present invention.
Figure 16:
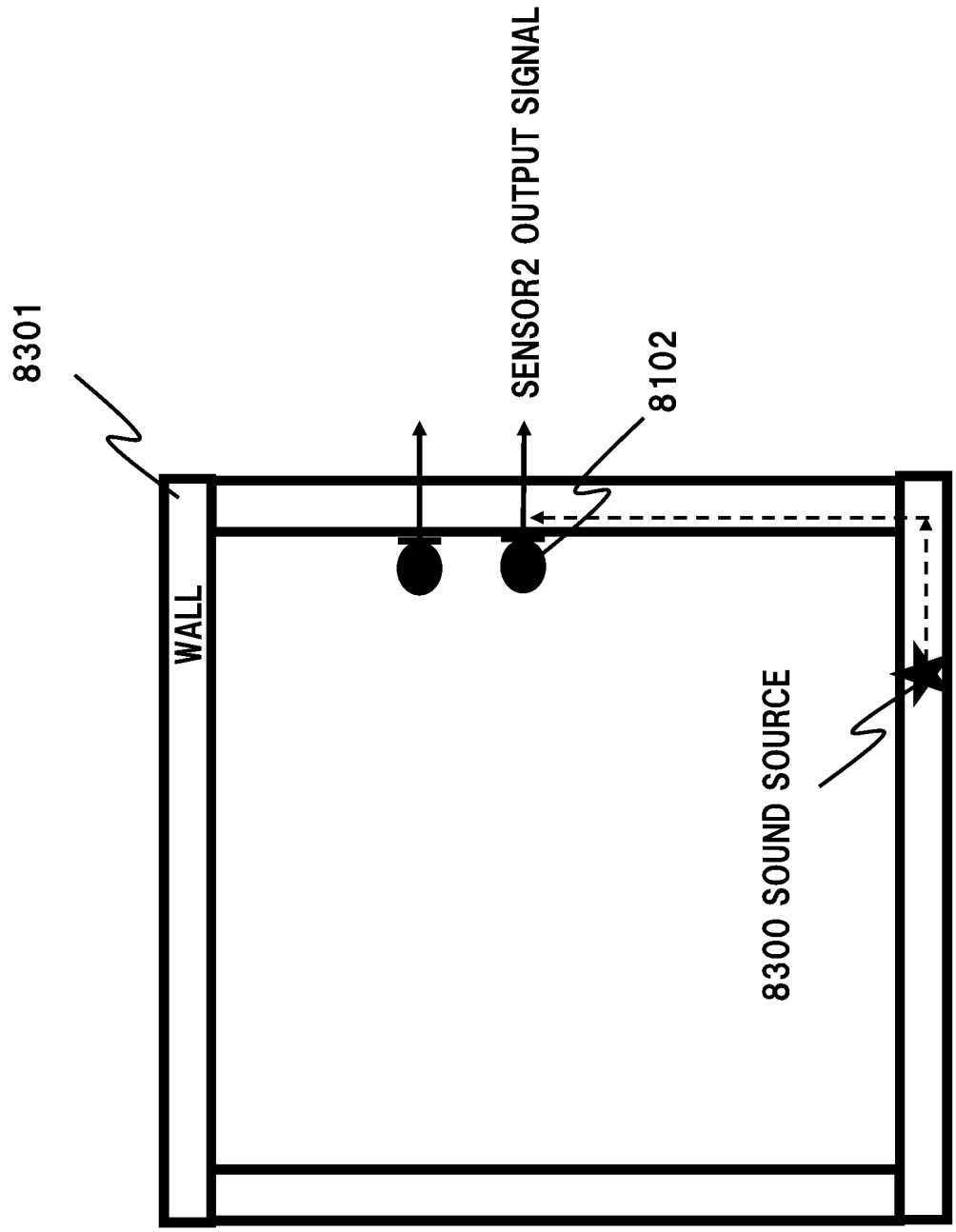
FIG. 16 is a diagram for explaining a path of sound reaching sensor 2 from a sound source whose propagation path is in the solid body in the eighth exemplary embodiment of the present invention.

In contrast, regarding the sound propagating in the solid body, as illustrated in FIG. 12, exemplified as a wall in this case, the sound source 8300 exists in contact with this solid body. In this case, as illustrated in FIG. 15, only an acoustic path being direct sound exists as an acoustic path arrived at the sensor 1 8101 from the sound source 8300, and reflected sound does not exist. Similarly, as illustrated in FIG. 16, an acoustic path arriving at the sensor 2 8100 from the sound source 8300 is also observed.

Here, a microphone is used as the sensor 1 8101 and sensor 2 8102. The feature value calculation part 8201 calculates sequentially cross spectra of a signal input from the sensor 8101 and sensor 8102. That is, regarding a signal sequence x1(t) of the sensor 8101 and a signal sequence x2(t) of the sensor 8102, if each Fourier transform is as X1(f), X2(f) and complex conjugation of X2(f) is as X2*(f), then it is possible to calculate cross spectra W(f) at a certain time as W(f)=(X1(f)X2*(f)).

These spectra themselves or a shape of the cross spectra cut out with a filter of an appropriate shape indicates, inverse of a similarity degree of a transfer function of a path from the sound source 8300 to the sensor 1 8101 and a path to the sensor 2 8102, that is, a difference.

Here, by performing norm normalization when calculating the cross spectra, it is also possible to remove dependency on loudness of sound.

By performing an inverse Fourier transform to this difference, a cross-correlation function between the plurality of sensors 8101 and 8102 is obtained. Here, this cross-correlation function is output as a feature value.

Next, it will be explained about operation of the transfer path decision part 8202. In a case where a cross-correlation function generated by the feature value calculation part 8201 has a single peak, it is evident that only relationship of time delay between the plurality of sensors 8101 and 8102 exists. In this case, since influence by a reflected wave does not exist, the transfer path decision part 8202 decides as a sound propagated in the solid body and outputs so as a decision result 8401.

On the other hand, in a case where the cross-correlation function generated by the feature value calculation part 8201 has a plurality of peaks, since a relationship other than the time delay between the plurality of sensors 8101 and 8102 exists, the influence by the reflected wave exists, therefore, the transfer path decision part 8202 decides as a sound propagated in the air and outputs so as a decision result 8401.

Here, though it is explained that the number of the sensors is two, the number of the sensors may be three or more, the decision may be performed between respective ones, and the decision may be performed by taking a majority vote, a logical sum, or a logical product, whereby it is possible to enhance estimation accuracy.

In addition, the transfer path decision part 8202 may operate only when a receive signal has a certain amount of power or more. Thereby, it is also possible to reduce an error occurring by a small power signal, that is, under a condition of a small S/N ratio.

Further, though in (through) the air and solid body are explained as a typical transfer path(s) in the above exemplary embodiments, another medium may be used under a condition within a range (condition) that the air is a typical path for which reflection exists and the solid body is a typical path for which reflection does not exist. For example, the air can be replaced by a gas such as nitrogen or the like, or a liquid such as water or the like. Also the solid body can be replaced by a gel like substance with a sufficiently high viscosity.

Next, it will be explained about effects of the present exemplary embodiment. According to the present exemplary embodiment, since the transfer path of a signal is estimated by using the plurality of the sensors, it is possible to estimate the transfer path provided that information of (at) only the receiving point exists, and there is no need of a model for which information regarding a transmission side or the transfer path is used. That is, in the present exemplary embodiment, since it is possible to calculate a range by normal operation without the need of a special in-space calibration, there is also an advantage of enabling to reduce an installation cost.

Ninth Exemplary Embodiment

Figure 17:
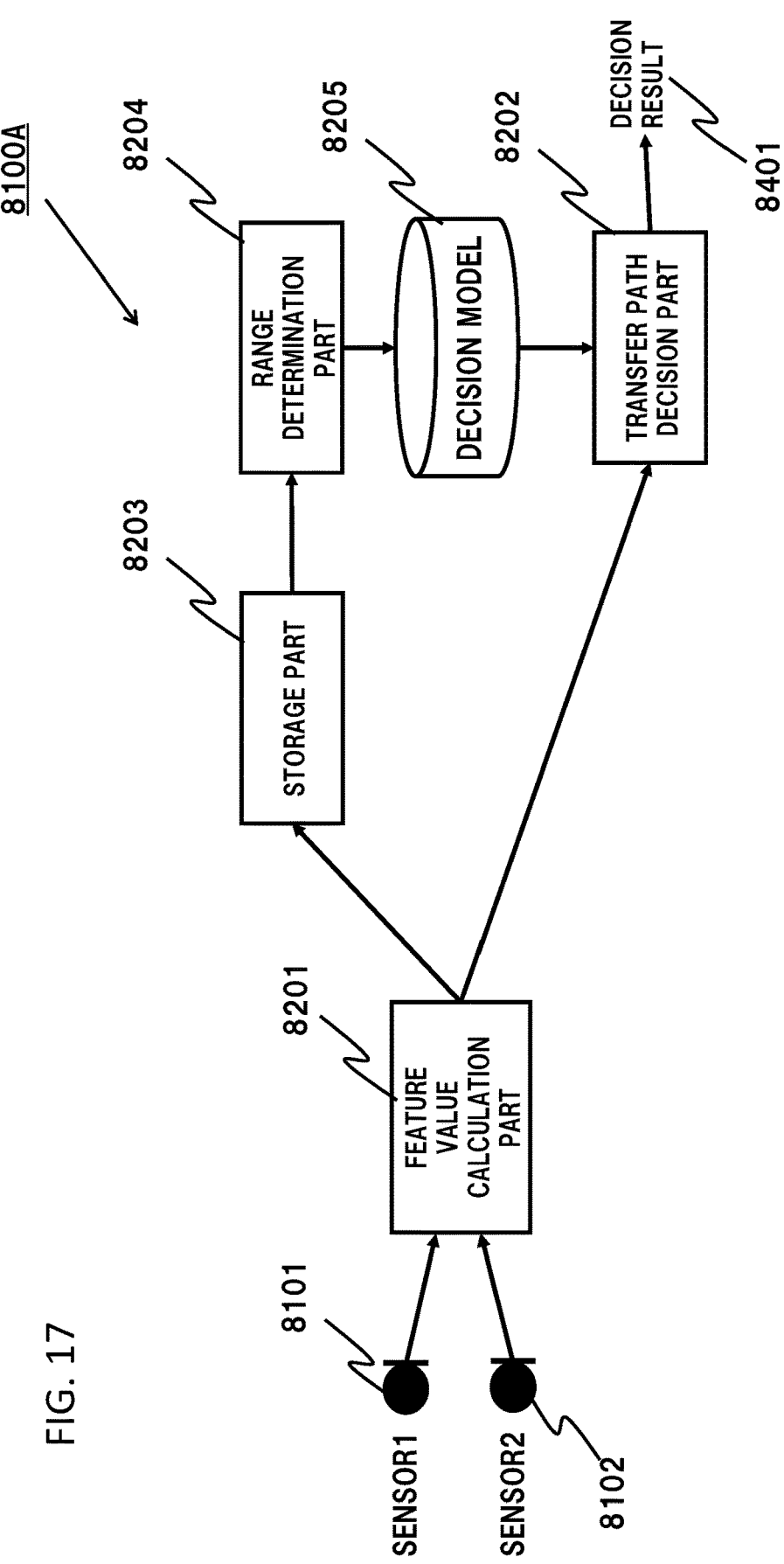
FIG. 17 is a diagram illustrating a mode for implementing a ninth exemplary embodiment of the present invention.

To continue, it will be explained about a ninth exemplary embodiment enabling to further improve determination accuracy of the above transfer path, by using figures in detail. FIG. 17 is a block diagram illustrating a configuration of the ninth exemplary embodiment of the present invention. Referring to FIG. 17, a transfer path identification part 8100A in the ninth exemplary embodiment of the present invention includes a storage part 8203, range determination part 8204, and decision model 8205, additional to the configuration of the eighth exemplary embodiment. Since other configurations are the same as the first exemplary embodiment, hereinafter, it will be explained mainly on its different point.

The storage part 8203 stores a feature value calculated by a feature value calculation part 8201 in the past for a predetermined period of time. The storage period of the feature value of the storage part 8203 may be a long period of time, such as since the plurality of the sensors 8101 and 8102 has been installed, or the like, for example, and typically may be a period that the feature value of the past one day is stored, for example. Hereinafter, in the present exemplary embodiment, it will be explained under assumption that a length of one frame is one second and the storage part 8203 stores 86400 frames for one day without overlapping.

Figure 18:
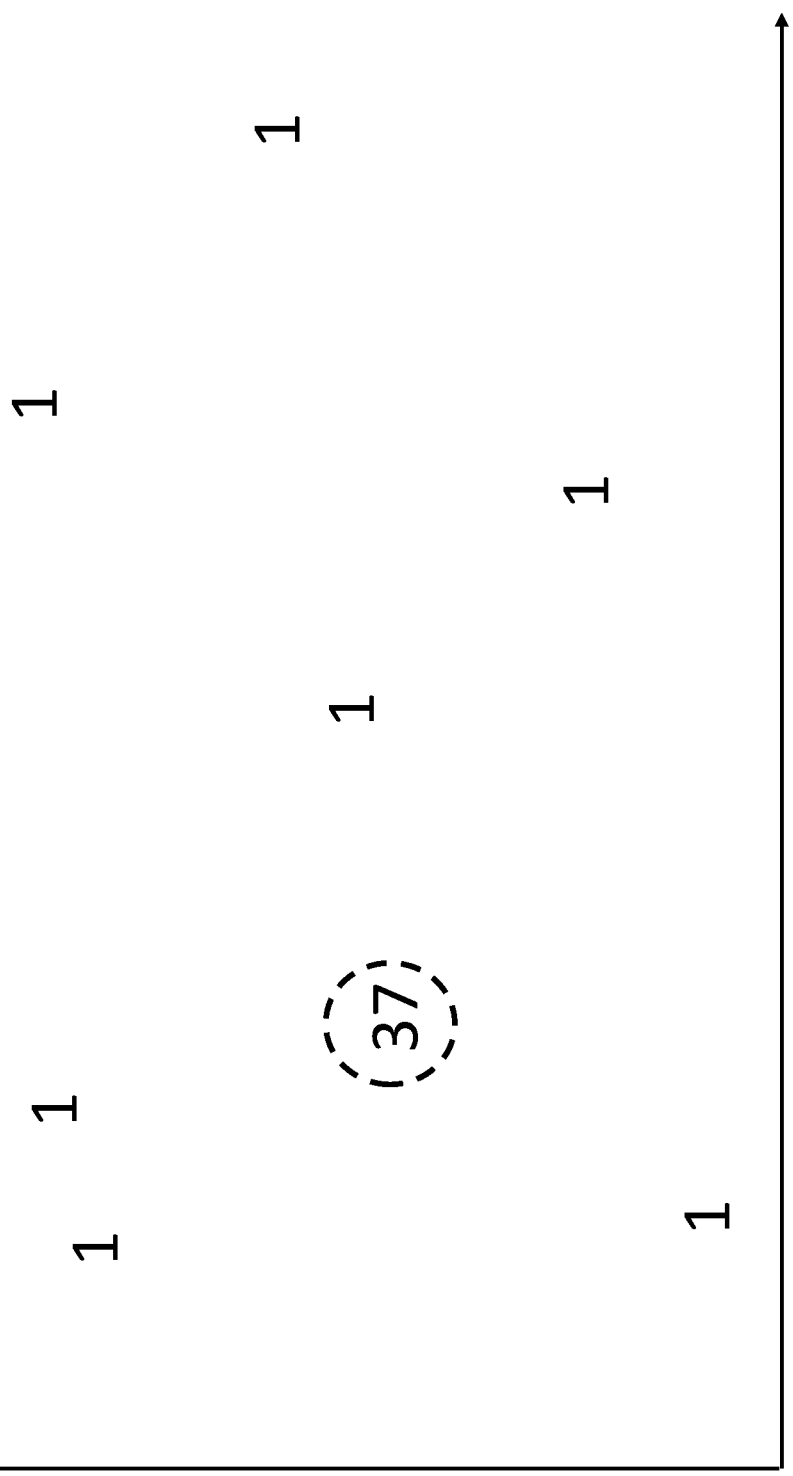
FIG. 18 is a diagram for explaining operation of the ninth exemplary embodiment of the present invention.

The range determination part 8204 maps feature quantities of all frames stored in the storage part 8203 to a feature value space. FIG. 18 is a diagram illustrating an example of mapping of the feature quantities by the range determination part 8204. In the example of FIG. 18, though only 44 frames are described, it is similar if the number of the stored frame is changed.

Here, FIG. 18 is a two-dimensional histogram (also referred to as a "heat map") with two cross-correlation functions as variables, which represents how many frames correspond to the relevant feature value as a numerical value. In the example of FIG. 18, "37" frames have approximately a same feature value and each of remaining frames has a different feature value. Here, the fact that many frames have the same feature value means that variance of the feature value is small and is composed of only delay terms, therefore, it is possible to determine a range indicated by a dotted circle in FIG. 18 as a range of the feature value whose propagation path is in the solid body. On the other hand, since the variance of the feature value is large in the other area, it is possible to determine the other ranges as a range of the feature value whose propagation path is in the air. It is possible to adopt a condition that all points which exceed a predetermined threshold value D is taken, as a condition that there are many frames. Of course, instead of the condition that the threshold value D is exceeded, a feature value which takes a maximum value may be used. Further, a radius c of a circle of the range can be predetermined as a small value assuming a range affected by the noise.

The decision model 8205 is a model in which information of the range obtained in this way is stored as a decision model. Therefore, the above range determination part 8204 can be called as a decision model generation part.

Further, the above storage part 8203 can be configured by using a storage device of a computer which configures a transfer path identification part. Similarly, the decision model 8205 can also be stored in the storage apparatus of the computer which configures the transfer path identification part.

The transfer path decision part 8202 compares a value of a feature value output by the feature value calculation part 8201 with the information of the range stored in the decision model (a path identification model) 8205, decides whether a relevant feature value is the propagation path in the air or the propagation path in the solid body, and outputs a relevant decision result 8401 as a decision result.

Next, it will be explained about effects of the present exemplary embodiment. Since a decision can be performed by using past information in the present exemplary embodiment, it is possible to perform proper-most determination according to an installed environment and improve its accuracy. Further, though it is explained as that the feature value for the past one day period is stored and the decision model (path identification model) 8205 is generated in the above exemplary embodiment, the stored feature value may be stratified (layer-structured) according to various viewpoints and a plurality of decision models (path identification models) may be generated. For example, in a case where the environment in which the path identification part is installed changes by time or season, it is also possible to generate a decision model(s) by using a feature value obtained in a time zone including the time concerned or corresponding season and perform determination by using this decision model(s).

By using the transfer path identification part in the above eighth and ninth exemplary embodiments, it is possible to identify two types of propagation method of the propagation in the air and the propagation in the solid body with a higher accuracy than a conventional method. By adopting this transfer path identification part, it is possible to determine a difference between the transfer paths having different properties such as in the air or in the solid body in the first, fifth and sixth exemplary embodiments, enabling to perform pattern recognition more robustly.

As explained above, though each of exemplary embodiments of the present invention is explained, the present invention is not limited to the above exemplary embodiments, and it is possible to add further modification, replacement, and adjustment within a range not deviating from technical idea of the present invention. For example, an apparatus configuration and a configuration of each element illustrated in each figure are examples to facilitate the understanding of the present invention, and are not limited to the configurations illustrated in these figures. In addition, in the following description, "A and/or B" is used in the sense of at least any one of A and B.

For example, though it is explained under an assumption that the input signal is the acoustic signal mainly in the above exemplary embodiments, an example of the input signal is not limited to this. For example, the present invention can be also applied to a signal such as a time sequence vibration signal or the like obtained from a vibration sensor, which propagates in the air and is transmitted, and whose characteristic changes depending on its transfer path. Of course, the sequential data includes not only a sequence data of equal intervals but also a sequence data of unequal intervals.

Various changes can be made to the configuration or details of the present invention, which can be understood by those skilled in the art within a scope of the present invention. Further, a system or apparatus that combines the separate features included in each of the exemplary embodiments in any way is also included in the scope of the present invention.

In addition, the present invention may be applied to a system configured by a plurality of apparatuses and to a single apparatus. Further, the present invention can be applied to a case where an information process program for realizing functions of the exemplary embodiments is fed to a system or apparatus in directly or from a remote place. Therefore, in order to realize a function of the present invention by a computer, a program installed in the computer, a medium storing the program, or a WWW (World Wide Web) server causing to download the program is included in the scope of the present invention. Especially, at least a non-transitory computer readable medium which stores a program causing a computer to execute process steps included in the above exemplary embodiments is included in the scope of the present invention.

In addition, procedures described in the above first to ninth exemplary embodiments can be implemented by a program causing a computer ("9000" in FIG. 19) functioning as the pattern recognition apparatus or transfer path identification part to realize a function as these apparatuses. This computer is exemplified as a configuration including a CPU (Central Processing Unit) 9010, communication interface 9020, memory 9030, auxiliary storage device 9040 of FIG. 19.

Figure 19:
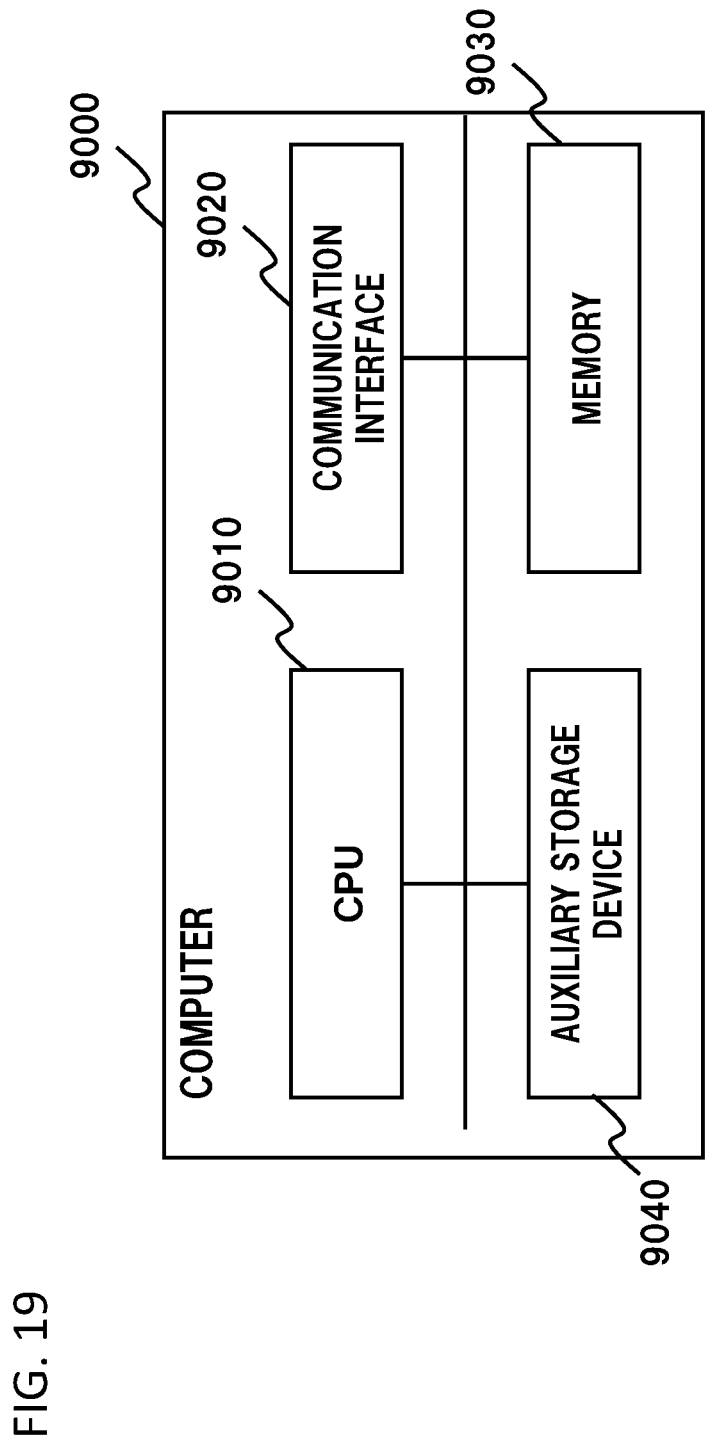
FIG. 19 is a diagram illustrating a configuration of a computer configurating a pattern recognition apparatus of the present invention.

That is, it is possible to cause the CPU 9010 of FIG. 19 to execute a pattern recognition program or transfer path feature extraction program and execute an update processing of each calculation parameter held in the auxiliary storage device 9040 or the like.

That is, the each part (processing means, function) of the pattern recognition apparatus or the transfer path identification part described in the above first to ninth exemplary embodiments can be realized by a computer program causing a processor installed in these apparatuses to execute the above each processing by using its hardware.

Finally, preferable Modes of the present invention are summarized.

First Mode (Refer to the pattern recognition apparatus according to the first aspect.)

Second Mode

In the pattern recognition apparatus, the models are a plurality of models generated by using a signal(s) observed via the transfer path(s) in each of different transfer paths of at least two or more,
further, a transfer path identification part can adopt a configuration that identifies a transfer path from a feature value of an input signal(s) is included, and
the pattern recognition part selects a model corresponding to the identified transfer path from the plurality of models and performs pattern recognition of the input signal.

Third Mode

The pattern recognition apparatus can adopt a configuration, wherein the model(s) is a model(s) generated by using the signal(s) for training, including a transfer path feature vector indicating a feature of a transfer path of the signal(s) for training, and
the pattern recognition apparatus further includes:
a transfer path feature vector extraction part that calculates a transfer path feature vector indicating a feature of a transfer path of an input signal,
wherein the pattern recognition part performs pattern recognition of the input signal by using the model(s) and by using the transfer path feature vector calculated from the input signal, additional to a feature of the input signal.

Fourth Mode

The pattern recognition apparatus can adopt a configuration which further includes:
a transfer path feature vector extraction part that calculates a transfer path feature vector indicating a feature of a transfer path of an input signal; and
a model correction part that corrects the model by using the transfer path feature vector,
wherein the pattern recognition part performs pattern recognition of the input signal by using the corrected model.

Fifth Mode

The pattern recognition apparatus can adopt a configuration which further includes:
an input signal correction part that corrects the input signal by using the transfer path feature vector,
wherein the pattern recognition part performs pattern recognition by using the corrected input signal.

Sixth Mode

The pattern recognition apparatus can adopt configuration further including:
a second transfer path identification part that identifies a transfer path from a feature value of an input signal; and
an information integrating part that integrates output of the pattern recognition part and output of the second transfer path identification part, and outputs an identification result.

Seventh Mode

It is possible to adopt a configuration wherein the input signal input in the pattern recognition apparatus is an acoustic signal, and pattern recognition is performed by identifying at least whether the transfer path is in air or in a solid body.

Eighth Mode

The pattern recognition apparatus can adopt a configuration configured by including at least one of the transfer path identification part and the second path identification part:
a feature value calculation part that calculates a feature value from sensor output signals of a plurality of sensors, and
a transfer path decision part that decides a transfer path corresponding to the feature value concerned.

Ninth Mode (Refer to the pattern recognition method according to the second aspect.)

Tenth Mode (Refer to the program according to the third aspect.)
Further, it is possible that the modes of ninth and tenth are expanded to the modes of second to eighth in the same way as the first mode.

Further, it is regarded that the above patent literatures and non-patent literature are incorporated by reference in the present application. Within the entire disclosure of the present invention (including claims), and based on the basic technical concept, it is possible to change and adjust the exemplary embodiments or examples. Also, various combinations or selections (including removal) of different disclosed elements (including each element of each claim, each element of each exemplary embodiment or example, each element of each figure, or the like) within the entire disclosure of the present invention are possible. That is, in the present invention, it is of course natural to include various variations or modifications that could be made by a person skilled in the art according to the entire disclosure including claims and the technical concept. Especially, even if there is no explicit description with respect to any number or a small range included in a numerical range described in the present application, it should be interpreted as such be concretely described in the present application.

REFERENCE SIGNS LIST

001, 111, 211, 301, 411, 511, 601, 711 received sound signal
002, 012, 202, 212, 302, 402, 412, 502, 512, 702, 712, 714, 722 transfer path feature extraction part
003, 724 path identification model storage part
004 path identification part
011 a pair of signal for path training and its label
013, 723 path identification model training part
100, 200, 300, 400, 500, 602, 900 pattern recognition apparatus
101, 201, 401, 501, 701 training signal
004, 102, 112, 603, 715, 800, 8100A transfer path identification part
103, 203, 404, 504, 704 model training part
104, 204, 303, 405, 505, 705, 901 model storage part
113 model switching part
114, 214, 305, 414, 515, 717, 902 pattern recognition part 304 model correction part
403, 413, 503, 513, 703, 713 input signal correction part
514, 716 model correction switching part
600 integrated type pattern recognition apparatus
604, 718 information integration part
721 path training signal
8101, 8102 sensor
8201 feature value calculation part
8202 transfer path decision part
8203 storage part
8204 range determination part
8205 decision model
8300 sound source
8301 wall
8401 decision result
9000 computer
9010 CPU
9020 communication interface
9030 memory
9040 auxiliary storage device

What is claimed is:

1. A pattern recognition apparatus, comprising:
at least a processor; and
a memory in circuit communication with the processor;
wherein the processor is configured to execute program instructions stored in the memory to implement:
a model storage part that stores a model(s) generated by using transfer path information indicating a difference of transfer paths of signals for training, additional to signals for training; and
a pattern recognition part that inputs an input signal and transfer path information indicating a difference of transfer paths of the input signals, and performs pattern recognition of the input signal by using the model(s), and
wherein the transfer paths of signals for training include air, a wood and a metal.

2. The pattern recognition apparatus according to claim 1, wherein further implemented is:
a transfer path identification part that identifies the transfer path from a feature value of the input signal(s),
wherein the models are a plurality of models generated by using a signal(s) observed via the transfer path(s) in each of different transfer paths of at least two or more, and
the pattern recognition part selects the model corresponding to the transfer path identified from the plurality of models and performs the pattern recognition of the input signal.

3. The pattern recognition apparatus according to claim 2, wherein further implemented are:
a second transfer path identification part that identifies the transfer path from the feature value of the input signal; and
an information integration part that integrates output of the pattern recognition part and output of the second transfer path identification part, and outputs an identification result.

4. The pattern recognition apparatus according to claim 3, wherein
at least one of the transfer path identification part and the second path identification part includes:
a feature value calculation part that calculates a feature value from sensor output signals of a plurality of sensors; and
a transfer path decision part that decides a transfer path corresponding to the feature value concerned.

5. The pattern recognition apparatus according to claim 1, wherein
the model(s) is a model(s) generated by using the signal(s) for training, including a transfer path feature vector indicating a feature of the transfer path of the signal(s) for training, and
a transfer path feature vector extraction part is further implemented to calculate a transfer path feature vector indicating a feature of the transfer path of the input signal,
wherein the pattern recognition part performs the pattern recognition of the input signal by using the model(s) and by using the transfer path feature vector calculated from the input signal, additional to a feature of the input signal.

6. The pattern recognition apparatus according to claim 1, wherein further implemented are:
a transfer path feature vector extraction part that calculates a transfer path feature vector indicating a feature of the transfer path of the input signal; and
a model correction part that corrects the model by using the transfer path feature vector,
wherein the pattern recognition part performs the pattern recognition of the input signal by the corrected model.

7. The pattern recognition apparatus according to claim 6, wherein further implemented is:
an input signal correction part that corrects the input signal by using the transfer path feature vector,
wherein the pattern recognition part performs the pattern recognition by using the corrected input signal.

8. The pattern recognition apparatus according to claim 1, wherein further implemented are:
a transfer path feature vector extraction part that calculates a transfer path feature vector indicating a feature of the transfer path of the input signal; and
an input signal correction part that corrects the input signal by using the transfer path feature vector,
wherein the pattern recognition part performs the pattern recognition by using the corrected input signal.

9. The pattern recognition apparatus according to claim 3, wherein
the input signal is an acoustic signal and the pattern recognition is performed by identifying at least whether the transfer path is in air or in a solid body.

10. A pattern recognition method, comprising:
providing a computer comprising:
at least a processor; and
a memory in circuit communication with the processor;
wherein the processor is configured to execute program instructions stored in the memory to implement:
a model storage part storing a model(s) generated by using transfer path information indicating a difference of transfer paths of signals for training, additional to signals for training;
inputting an input signal and transfer path information indicating a difference of transfer paths of the input signal; and
inputting the input signal and transfer path information to perform pattern recognition of the input signal by using the model(s), and
wherein the transfer paths of signals for training include air, a wood and a metal.

11. The pattern recognition method according to claim 10, further comprising:
a transfer path identification part identifying the transfer path from a feature value of the input signal(s), wherein the models are a plurality of models generated by using a signal(s) observed via the transfer path(s) in each of different transfer paths of at least two or more, and the pattern recognition comprises selecting the model corresponding to the transfer path identified from the plurality of models and performs the pattern recognition of the input signal.

12. The pattern recognition method according to claim 10, wherein the model(s) is a model(s) generated by using the signal(s) for training, including a transfer path feature vector indicating a feature of the transfer path of the signal(s) for training, and the method further comprises:

a transfer path feature vector extraction part calculating a transfer path feature vector indicating a feature of the transfer path of the input signal, wherein the pattern recognition comprises performing the pattern recognition of the input signal by using the model(s) and by using the transfer path feature vector calculated from the input signal, additional to a feature of the input signal.

13. The pattern recognition method according to claim 10 further comprising:

a transfer path feature vector extraction part calculating a transfer path feature vector indicating a feature of the transfer path of the input signal; and a model correction part correcting the model by using the transfer path feature vector, wherein the pattern recognition performs the pattern recognition of the input signal by the corrected model.

14. The pattern recognition method according to claim 13, further comprising:

correcting the input signal by using the transfer path feature vector, wherein the pattern recognition performs the pattern recognition by using the corrected input signal.

15. The pattern recognition method according to claim 10 further comprising:

a transfer path feature vector extraction part calculating a transfer path feature vector indicating a feature of the transfer path of the input signal; and an input signal correction part correcting the input signal by using the transfer path feature vector, wherein the pattern recognition performs the pattern recognition by using the corrected input signal.

16. The pattern recognition method according to claim 10, further comprising:

a second transfer path identification part identifying the transfer path from the feature value of the input signal; and an information integration part integrating output of the pattern recognition part and output of the second transfer path identification part, and outputs an identification result.

17. The pattern recognition method according to claim 10, wherein the input signal is an acoustic signal and the pattern recognition is performed by identifying at least whether the transfer path is in air or in a solid body.

18. A computer-readable non-transient recording medium storing a program, wherein the program performs pattern recognition the program being implemented by a model storage part that stores a model(s) generated by using transfer path information indicating a difference of transfer paths of signals for training, additional to signals for training, the program comprising:

inputting an input signal and transfer path information indicating a difference of transfer paths of the input signal; and inputting the input signal and transfer path information to perform pattern recognition of the input signal by using the model(s), and wherein the transfer paths of signals for training include air, a wood and a metal.

19. The medium according to claim 18, wherein the program further comprises:

a transfer path identification part identifying the transfer path from a feature value of the input signal(s), wherein the models are a plurality of models generated by using a signal(s) observed via the transfer path(s) in each of different transfer paths of at least two or more, and the pattern recognition comprises selecting the model corresponding to the transfer path identified from the plurality of models and performs the pattern recognition of the input signal.

20. The medium according to claim 18, wherein the model(s) is a model(s) generated by using the signal(s) for training, including a transfer path feature vector indicating a feature of the transfer path of the signal(s) for training, and the program further comprises:

a transfer path feature vector extraction part calculating a transfer path feature vector indicating a feature of the transfer path of the input signal, wherein the pattern recognition comprises performing the pattern recognition of the input signal by using the model(s) and by using the transfer path feature vector calculated from the input signal, additional to a feature of the input signal.

* * * * *